US012557150B2

(12) United States Patent
Lin et al.

(10) Patent No.: US 12,557,150 B2
(45) Date of Patent: *Feb. 17, 2026

(54) RADIO RESOURCE CONTROL RRC CONNECTION METHOD AND APPARATUS AND RRC RECONNECTION METHOD AND APPARATUS

(71) Applicant: HUAWEI TECHNOLOGIES CO., LTD., Guangdong (CN)

(72) Inventors: Bo Lin, Shenzhen (CN); Yajuan Li, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 36 days.

This patent is subject to a terminal disclaimer.

(21) Appl. No.: 17/333,874

(22) Filed: May 28, 2021

(65) Prior Publication Data
US 2021/0360712 A1 Nov. 18, 2021

Related U.S. Application Data

(63) Continuation of application No. 15/493,608, filed on Apr. 21, 2017, now Pat. No. 11,026,270, which is a
(Continued)

(51) Int. Cl.
*H04W 76/10* (2018.01)
*H04W 76/11* (2018.01)
(Continued)

(52) U.S. Cl.
CPC ............ *H04W 76/10* (2018.02); *H04W 76/11* (2018.02); *H04W 76/19* (2018.02); *H04W 68/02* (2013.01);
(Continued)

(58) Field of Classification Search
CPC . H04W 76/10; H04W 74/0833; H04W 76/11; H04W 76/19; H04W 68/02; H04W 76/27; H04W 80/04; H04W 36/08
See application file for complete search history.

(56) References Cited

U.S. PATENT DOCUMENTS 9,264,979 B2 * 2/2016 Fong .................... H04W 48/12
9,357,459 B2  5/2016 Raghothaman et al.
(Continued)

FOREIGN PATENT DOCUMENTS

CN  101867984  10/2010
CN  102223658  7/2014
(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 1 2), 3GPP TS 36.300 V1 2.3.0 (Sep. 2014), 215 pages.
(Continued)

*Primary Examiner* — Thinh D Tran
(74) *Attorney, Agent, or Firm* — Fish & Richardson P.C.

(57) ABSTRACT

Embodiments of the present invention relate to an RRC connection method and a serving node. In the embodiments, an RRC connection is established between an anchor node and UE. Therefore, when an serving node of the UE is switched, a connection between an MME and the anchor node does not change. When the MME needs to send a paging message, the MME does not need to send the paging message to all base stations in a TA area that corresponds to the paging message, thereby effectively reducing signaling load of a core network.

20 Claims, 12 Drawing Sheets

Related U.S. Application Data continuation of application No. PCT/CN2014/089283, filed on Oct. 23, 2014.

(51) Int. Cl.

| | | |
|---|---|---|
| *H04W 76/19* | (2018.01) | |
| *H04W 68/02* | (2009.01) | |
| *H04W 74/0833* | (2024.01) | |
| *H04W 76/27* | (2018.01) | |
| *H04W 80/04* | (2009.01) | |

(52) U.S. Cl.
CPC ........ *H04W 74/0833* (2013.01); *H04W 76/27* (2018.02); *H04W 80/04* (2013.01)

(56) References Cited

U.S. PATENT DOCUMENTS

| | | | |
|---|---|---|---|
| 9,467,331 | B2 | 10/2016 | Takahashi et al. |
| 9,622,164 | B2 | 4/2017 | Kim et al. |
| 10,433,188 | B2 | 10/2019 | Shindo |
| 2010/0238909 | A1 | 9/2010 | Kim |
| 2010/0265915 | A1* | 10/2010 | Sun ................. H04W 36/0033 370/331 |
| 2010/0284278 | A1 | 11/2010 | Alanara |
| 2011/0242970 | A1* | 10/2011 | Prakash ................ H04W 76/38 370/216 |
| 2013/0089022 | A1 | 4/2013 | Lu et al. |
| 2014/0128092 | A1* | 5/2014 | Xiong .................. H04W 16/32 455/454 |
| 2014/0220974 | A1 | 8/2014 | Hsu et al. |
| 2014/0241317 | A1 | 8/2014 | Jamadagni et al. |
| 2014/0286305 | A1 | 9/2014 | Yamada |
| 2014/0349694 | A1* | 11/2014 | Raghothaman ....... H04W 76/14 455/509 |
| 2015/0319670 | A1 | 11/2015 | Jung et al. |
| 2015/0341977 | A1 | 11/2015 | Fukuta et al. |
| 2015/0365984 | A1* | 12/2015 | Lee ...................... H04W 72/27 370/329 |
| 2016/0212661 | A1* | 7/2016 | Basu Mallick ... H04W 36/0027 |
| 2016/0227518 | A1 | 8/2016 | Li et al. |
| 2016/0262194 | A1* | 9/2016 | Zhang .................. H04W 72/21 |
| 2016/0374077 | A1 | 12/2016 | Fukuta et al. |

FOREIGN PATENT DOCUMENTS

| | | |
|---|---|---|
| CN | 103987124 | 8/2014 |
| EP | 1845749 | 10/2007 |
| JP | 2013102406 | 5/2013 |
| KR | 20080098652 | 11/2008 |
| KR | 20100069125 A | 6/2010 |
| RU | 2450485 | 5/2012 |
| WO | 2011016195 | 2/2011 |
| WO | 2013166330 | 11/2013 |
| WO | 2014029668 | 2/2014 |
| WO | 2014098496 | 6/2014 |
| WO | 2014103145 | 7/2014 |
| WO | 2014112597 | 7/2014 |
| WO | 2014163143 | 10/2014 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V1 2.3.0 (Sep. 2019), 378 pages.

3rd Generation Partnership Project; Technical Specification Group Services and System Aspects; 3GPP System Architecture Evolution (SAE); Security Architecture (Release 12) 3GPP TS 33.401 V12. 1 2.0; Sep. 2014; 129 pages.

Gurusanthosh et al., "SDMA: A Semi-Distributed Mobility Anchoring in LTE Networks," 2013 International Conference on Selected Topics in Mobile and Wireless Networking (MoWNeT), Aug. 2013, 7 pages.

Huawei et al.; "Solution for Reduction of Signalling Load Towards Core Network" 3GPP TSG-RAN WG2 Meeting #83; R2-1 32853; Barcelona, Spain, Aug. 19-23, 2013; 4 pages.

Jose Bruno Iniguez Chavarrfa, ""LTE Handover Performance Evaluation Based on Power Budget Handover Algorithm, "" UniversitatPolitecnica de Catalunya, Feb. 2014, 63 pages.

Li Xiandong et al., "Dual Connectivity for 3GPP LTE—Advanced Mobile Communication System," Modern Science and Technology of Telecommunications, Sep. 2014, 7 pages (with English translation).

LTE4you; "LTE Call Flow Detail"; lte4you blogspot; Jun. 27, 2014; accessed from http://lte4you.blogspot.com/2014/06/lte-call-flow-detail.html; 28 pages.

Nokia et al.; "Mobility Enhancement for Non-CA Capable UE"; 3GPP TSG-RAN WG2 Meeting #83; R2- 1 32416 ; Barcelona, Spain; Aug. 19-23, 2013; 3 pages.

Office Action issued in Chinese Application No. 201910295028.5 on Mar. 18, 2020, Mar. 18, 2020, 10 pages (with English translation).

Office Action issued in Chinese Application No. 201910295028.5 on Oct. 9, 2020, 7 pages (with English translation).

Office Action issued in Indian Application No. 201737014983 on Oct. 30, 2020, 5 pages.

Office Action in Indian Appln. No. 201737014983, mailed on Feb. 5, 2024, 3 pages (with English translation).

* cited by examiner

RADIO RESOURCE CONTROL RRC CONNECTION METHOD AND APPARATUS AND RRC RECONNECTION METHOD AND APPARATUS

CROSS-REFERENCE TO RELATED APPLICATIONS

This application is a continuation of U.S. patent application Ser. No. 15/493,608, filed on Apr. 21, 2017, which is a continuation of International Application No. PCT/CN2014/089283, filed on Oct. 23, 2014. All of the afore-mentioned patent applications are hereby incorporated by reference in their entireties.

TECHNICAL FIELD

The present invention relates to the field of mobile communications, and in particular, to a radio resource control RRC connection method and apparatus, and an RRC reconnection method and apparatus.

BACKGROUND

As a quantity of user equipments (UE) keeps increasing, an existing wireless communications system can no longer meet wireless communication requirements of users. Therefore, a system capacity of the wireless communications system urgently needs to be increased. A method of adding a base station may be used to increase the system capacity. In a conventional manner, a large quantity of small base stations are densely deployed in one macro cell, so as to form more micro cells. However, most of the UEs are connected to only one base station, and the base station provides a wireless communication service to the UEs. For ease of description, the base station that provides the wireless communication service to the UEs is referred to as a serving node of the UEs.

In the prior art, when UE moves from one cell to another cell, or when UE moves from a coverage area of one base station to a coverage area of another base station, or when UE discovers a radio link failure (RLF), the UE may switch a serving node, that is, the serving node of the UE is switched from one base station to another base station. The serving node is connected to a mobility management entity (MME) by using a control plane interface, and the serving node is connected to a serving gateway (SGW) by using a user plane interface. Therefore, after the serving node of the UE is switched, a new serving node and the MME need to send signaling to update an S1 control plane connection between the serving node and the MME, and the MME and the SGW also need to send signaling to update an S1 user plane connection between the serving node and the SGW. In this case, at least four messages are used for each switching process. When a quantity and a deployment density of base stations increase, a quantity of times of switching increases rapidly, causing a rapid increase in signaling load of a core network. Moreover, each serving node is connected to the MME by using the control plane interface. When needing to send a paging message, the MME sends the paging message to all base stations in a tracking area (TA) area that corresponds to the paging message, causing a rapid increase in the signaling load of the core network.

SUMMARY

Embodiments of the present invention provide a radio resource control (RRC) connection method and apparatus, and an RRC reconnection method and apparatus, so as to resolve a problem of rapidly increased signaling load of a core network caused by switching of a serving node or sending of a paging message by an MME when base stations are densely deployed in the prior art.

According to a first aspect, an RRC connection apparatus is provided, where the apparatus is disposed on a serving node, and the apparatus includes:
- a sending unit, configured to broadcast a system message;
- a receiving unit, configured to receive a random access message sent by first user equipment UE according to the system message sent by the sending unit, where
- the sending unit is further configured to send a random access response message to the first UE according to the random access message received by the receiving unit; and
- the receiving unit is further configured to receive an RRC connection request message sent by the first UE according to the random access response message sent by the sending unit; and
- a message generation unit, configured to generate an RRC connection establishment message according to the RRC connection request message received by the receiving unit, where
- the sending unit is further configured to send the RRC connection establishment message generated by the message generation unit to the first UE;
- the receiving unit is further configured to receive an RRC connection establishment complete message sent by the first UE; and
- the sending unit is further configured to send the RRC connection establishment complete message received by the receiving unit to the first anchor node, to enable the first anchor node to establish an RRC connection to the first UE.

With reference to the first aspect, in a first implementation of the first aspect, the message generation unit includes:
- a selection subunit, configured to select the first UE from at least one UE including the first UE according to an RRC connection request message that is sent by the at least one UE and that is received by the receiving unit; and
- a message generation subunit, configured to generate the RRC connection establishment message of the first UE according to the RRC connection request message of the first UE selected by the selection subunit.

With reference to the first aspect or the first implementation of the first aspect, in a second implementation of the first aspect, the sending unit is further configured to: before the receiving unit receives the RRC connection establishment complete message sent by the first UE, send a configuration parameter of the first UE and a UE identifier of the first UE to the first anchor node.

With reference to the second implementation of the first aspect, in a third implementation of the first aspect, the sending unit is specifically configured to send the RRC connection establishment message to the first anchor node, where the RRC connection establishment message includes the configuration parameter of the first UE; and
the RRC connection establishment message carries first indication information, or a control plane signaling message that bears the RRC connection establishment message carries first indication information, where the first indication information is used for the first anchor node to recognize, according to the first indication information, that the RRC connection establishment message is an RRC message that a signaling radio bearer SRB0 bears, where the RRC message is processed by using an RRC layer entity of the first anchor node.

With reference to the second implementation of the first aspect, in a fourth implementation of the first aspect, the sending unit is specifically configured to send the RRC connection establishment message to the first anchor node, where the RRC connection establishment message includes the configuration parameter of the first UE; and the sending unit is further configured to: send first indication information to the first anchor node, where the first indication information is used for the first anchor node to recognize, according to the first indication information, that the RRC connection establishment message is air RRC message that a signaling radio bearer (SRB) 0 bears, where the RRC message is processed by using an RRC layer entity of the first anchor node.

With reference to the first aspect, in a fifth implementation of the first aspect, the sending unit is specifically configured to send second indication information to the first anchor node by adding the second indication information to the RRC connection establishment complete message or by adding the second indication information to a control plane signaling message that bears the RRC connection establishment complete message, where the second indication information is used for the first anchor node to recognize, according to the second indication information, that the RRC connection establishment complete message is an RRC message that a signaling radio bearer SRB1 bears.

With reference to the first aspect, in a sixth implementation of the first aspect, the sending unit is further configured to send second indication information to the first anchor node, where the second indication information is used for the first anchor node to recognize, according to the second indication information, that the RRC connection establishment complete message is an RRC message that a signaling radio bearer SRB1 bears.

With reference to the first aspect or any one of the first to sixth implementations of the first aspect, in a seventh implementation of the first aspect, the apparatus further includes:

a packet data processing unit, configured to process, by using a radio link control RLC layer entity, an RRC message that is sent by the first UE and that includes the RRC connection establishment complete message into a corresponding packet data convergence protocol protocol data unit (PDCP PDU) and send the PDCP PDU to the first anchor node, where the RRC message includes an RRC message that a signaling radio bearer SRB1 bears or an RRC message that an SRB2 bears, the RRC connection establishment complete message is an RRC message that an SRB1 bears; and the RRC message is used for a first PDCP layer entity in the first anchor node to process the RRC message that an SRB1 bears and send the processed RRC message to the RRC layer entity, or the RRC message is used for a second PDCP layer entity in the first anchor node to process the RRC message that an SRB2 bears and send the processed RRC message to the RRC layer entity.

With reference to the first aspect or any one of the first to seventh implementations of the first aspect, in an eighth implementation of the first aspect, the receiving unit is specifically configured to receive a packet data convergence protocol protocol data unit PDCP PDU corresponding to an RRC message sent by the first anchor node, where the RRC message includes an RRC message that a signaling radio bearer SRB1 bears or an RRC message that an SRB2 bears; the RRC message is used for a first radio link control (RLC) layer entity of the serving node to process the RRC message that an SRB1 bears and send the processed RRC message to the first UE by using a Media Access Control (MAC) layer and a physical layer, or the RRC message is used for a second RLC layer entity of the serving node to process the RRC message that an SRB2 bears and send the processed RRC message to the first UE by using a MAC layer and a physical layer.

According to a second aspect, an RRC reconnection apparatus is provided, where the apparatus is disposed on a serving node, and the apparatus includes:

a sending unit, configured to broadcast a system message;
a receiving unit, configured to receive a random access message sent by first user equipment UE according to the system message sent by the sending unit, where
the sending unit is further configured to send a random access response message to the first UE according to the random access message received by the receiving unit;
the receiving unit is further configured to receive an RRC connection reestablishment request message sent by the first UE according to the random access response message sent by the sending unit; and
a message generation unit, configured to generate an RRC connection reestablishment message according to the RRC connection reestablishment request message received by the receiving unit, where
the sending unit is further configured to send the RRC connection reestablishment message generated by the message generation unit to the first UE; and
the receiving unit is further configured to receive an RRC connection reestablishment complete message sent by the first UE according to the RRC connection reestablishment message sent by the sending unit; and
the sending unit is further configured to send the RRC connection reestablishment complete message received by the receiving unit to a first anchor node, to enable the first anchor node to reestablish an RRC connection to the first UE.

With reference to the second aspect, in a first implementation of the second aspect, the apparatus further includes:

a first obtaining unit, configured to: before the sending unit sends the RRC connection reestablishment message to the first UE, obtain a first user equipment identifier UEID and a next hop chaining count (NCC) of the first UE to which the first anchor node has established an RRC connection;
the receiving unit is specifically configured to receive the RRC connection reestablishment request message sent by the first UE, where the RRC connection reestablishment request message includes the first UEID;
the message generation unit is specifically configured to obtain, according to the first UEID received by the receiving unit, the NCC obtained by the first obtaining unit, and generate the RRC connection reestablishment message including the NCC; and
the sending unit is specifically configured to send the RRC connection reestablishment message generated by the message generation unit to the first UE, so that the first UE derives a new key according to the NCC.

With reference to the first implementation of the second aspect, in a second implementation of the second aspect, the first obtaining unit is specifically configured to:

after the first anchor node has established an RRC connection to the first UE, obtain the first user equipment identifier UEID and the next hop chaining count NCC of the first UE to which the first anchor node has established an RRC connection; or after a request message is sent to the first anchor node, receive the first UEID and the NCC of the first UE to which an RRC connection has been established that are sent by the first anchor node.

With reference to the first implementation of the second aspect, in a third implementation of the second aspect, the apparatus further includes:

a signaling receiving unit, configured to: after the first obtaining unit obtains the first user equipment identifier UEID and the next hop chaining count NCC of the first UE to which the first anchor node has established an RRC connection, and after the RRC connection of the first UE is disconnected from the first anchor node, receive signaling sent by the first anchor node: and a release unit, configured to release the NCC of the first UE according to the signaling received by the signaling receiving unit.

With reference to the second aspect, in a fourth implementation of the second aspect, the apparatus further includes:

a second obtaining unit, configured to: before the sending unit sends the RRC connection reestablishment message to the first UE, obtain an identifier of a neighboring cell served by the first anchor node, where the sending unit is further configured to: when it is recognized, according to an identifier of a source cell included in the RRC connection reestablishment request message received by the receiving unit, that the source cell is the neighboring cell served by the first anchor node or the source cell is a current cell, send fourth indication information to the first UE, where the fourth indication information is used to instruct the first UE to use an original key, or indicate that a key of the first UE does not change, or instruct the first UE to generate a new key by using a key KeNB of an evolved node B NodeB.

With reference to the second aspect, in a fifth implementation of the second aspect, the sending unit is further configured to: before the receiving unit receives the RRC connection reestablishment complete message sent by the first UE, send the RRC connection reestablishment message and first indication information to the first anchor node, where the first indication information is used for the first anchor node to recognize, according to the first indication information, that the RRC connection reestablishment message is an RRC message that a signaling radio bearer SRB0 bears, where the RRC message is processed by using an RRC layer entity of the first anchor node.

With reference to the second aspect, in a sixth implementation of the second aspect, the sending unit is further configured to: before the receiving unit receives the RRC connection reestablishment complete message sent by the first UE, send the RRC connection reestablishment message to the first anchor node, where the RRC connection reestablishment message carries first indication information, or a control plane signaling message that bears the RRC connection reestablishment message carries first indication information, where the first indication information is used for the first anchor node to recognize, according to the first indication information, that the RRC connection reestablishment message is an RRC message that a signaling radio bearer SRB0 bears, where the RRC message is processed by using an RRC layer entity of the first anchor node.

With reference to the second aspect, in a seventh implementation of the second aspect, the sending unit is further configured to: before the receiving unit receives the RRC connection reestablishment complete message sent by the first UE, send a configuration parameter of the first UE to the first anchor node.

With reference to the second aspect, in an eighth implementation of the second aspect, the sending unit is specifically configured to send second indication information to the first anchor node by adding the second indication information to the RRC connection reestablishment complete message or adding the second indication information to a control plane signaling message that bears the RRC connection reestablishment complete message, where the second indication information is used for the first anchor node to recognize, according to the second indication information, that the RRC connection reestablishment complete message is an RRC message that a signaling radio bearer SRB1 bears.

With reference to the second aspect, in a ninth implementation of the second aspect, the sending unit is further configured to send second indication information to the first anchor node, where the second indication information is used for the first anchor node to recognize, according to the second indication information, that the RRC connection reestablishment complete message is an RRC message that a signaling radio bearer SRB1 bears.

With reference to the second aspect, in a tenth implementation of the second aspect, the apparatus further includes:

a packet data processing unit, configured to process, by using a radio link control RLC layer entity, an RRC message that is sent by the first UE and that includes the RRC connection reestablishment complete message into a corresponding packet data convergence protocol protocol data unit PDCP PDU, where the RRC message includes an RRC message that an SRB1 bears or an RRC message that an SRB2 bears, the RRC connection reestablishment complete message is an RRC message that an SRB1 bears, and the RRC message is used for a first PDCP layer entity in the first anchor node to process the RRC message that an SRB1 bears and send the processed RRC message to an RRC layer entity, or the RRC message is used for a second PDCP layer entity in the first anchor node to process the RRC message that an SRB2 bears and send the processed RRC message to the RRC layer entity.

With reference to the second aspect, in an eleventh implementation of the second aspect, the receiving unit is specifically configured to receive a packet data convergence protocol protocol data unit PDCP PDU corresponding to an RRC message sent by the first anchor node, where the RRC message includes an RRC message that an SRB1 bears or an RRC message that an SRB2 bears, and the RRC message is used for a first radio link control RLC layer entity of the second serving node to process the RRC message that an SRB1 bears and send the processed RRC message to the first UE by using a Media Access Control MAC layer and a physical layer, or the RRC message is used for a second RLC layer entity of the second serving node to process the RRC message that an SRB2 bears and send the processed RRC message to the first UE by using a MAC layer and a physical layer.

According to a third aspect, an RRC connection apparatus is provided, where the apparatus is disposed on an anchor node, and the apparatus includes:

a receiving unit, configured to receive an RRC connection establishment complete message sent by the serving node; and a connection establishment unit, configured to establish an RRC connection between the first anchor node and the first UE according to the RRC connection establishment complete message received by the receiving unit, where the RRC connection establishment complete message is the RRC connection establishment complete message generated by the first UE according to an RRC connection establishment message sent by the serving node, and the RRC connection establishment complete message is sent to the serving node.

With reference to the third aspect, in a first implementation of the third aspect, the receiving unit is further configured to: before the serving node receives the RRC connection establishment complete message sent by the first UE, receive a configuration parameter and a UE identifier of the first UE that are sent by the serving node.

With reference to the first implementation of the third aspect, in a second implementation of the third aspect, the receiving unit is specifically configured to receive the RRC connection establishment message sent by the serving node, where the RRC connection establishment message includes the configuration parameter of the first UE;

the RRC connection establishment message carries first indication information, or a control plane signaling message that bears the RRC connection establishment message carries first indication information; and the apparatus further includes:

a recognition unit, configured to recognize, according to the first indication information, that the RRC connection establishment message is an RRC message that a signaling radio bearer SRB0 bears, where the RRC message is processed by using an RRC layer entity of the first anchor node.

With reference to the first implementation of the third aspect, in a third implementation of the third aspect, the receiving unit is specifically configured to receive the RRC connection establishment message sent by the serving node, where the RRC connection establishment message includes the configuration parameter of the first UE;

the receiving unit is further configured to receive first indication information sent by the serving node; and the apparatus further includes:

a recognition unit, configured to recognize, according to the first indication information, that the RRC connection establishment message is an RRC message that a signaling radio bearer SRB0 bears, where the RRC message is processed by using an RRC layer entity of the first anchor node.

With reference to the third aspect, in a fourth implementation of the third aspect, the receiving unit is specifically configured to receive a control plane signaling message that is sent by the serving node and that bears the RRC connection establishment complete message, where the RRC connection establishment complete message carries second indication information, or the control plane signaling message carries second indication information; and the apparatus further includes:

a recognition unit, configured to recognize, according to the second indication information, that the RRC connection establishment complete message is an RRC message that an SRB1 bears.

With reference to the third aspect, in a fifth implementation of the third aspect, the receiving unit is further configured to receive second indication information sent by the serving node; and the apparatus further includes:

a recognition unit, configured to recognize, according to the second indication information, that the RRC connection establishment complete message is an RRC message that an SRB1 bears.

With reference to the third aspect, in a sixth implementation of the third aspect, the receiving unit is specifically configured to receive a corresponding packet data convergence protocol protocol data unit PDCP PDU sent after a radio link control RLC layer entity of the serving node processes an RRC message that is sent by the first UE and that includes the RRC connection establishment complete message into the PDCP PDU, where the RRC message includes an RRC message that an SRB1 bears or an RRC message that an SRB2 bears, and the RRC connection establishment complete message is an RRC message that an SRB1 bears; and the apparatus further includes:

a first packet data processing unit, configured to: process, by using a first PDCP layer entity, the RRC message that an SRB1 bears, and send the processed RRC message to an RRC layer entity; and a second packet data processing unit, configured to: process, by using a second PDCP layer entity, the RRC message that an SRB2 bears, and send the processed RRC message to the RRC layer entity.

With reference to the third aspect or any one of the first to sixth implementations of the third aspect, in a seventh implementation of the third aspect, the apparatus further includes:

a sending unit, configured to send a packet data convergence protocol protocol data unit PDCP PDU corresponding to an RRC message to the serving node, where the RRC message includes an RRC message that an SRB1 bears or an RRC message that an SRB2 bears, and the RRC message is used for a first radio link control RLC layer entity of the serving node to process the RRC message that an SRB1 bears and send the processed RRC message to the first UE by using a Media Access Control MAC layer and a physical layer, or the RRC message is used for a second RLC layer entity of the serving node to process the RRC message that an SRB2 bears and send the processed RRC message to the first UE by using a MAC layer and a physical layer.

According to a fourth aspect, an RRC reconnection apparatus is provided, where the apparatus is disposed on an anchor node, and the apparatus includes:

a receiving unit, configured to receive an RRC connection reestablishment complete message sent by a second serving node; and a connection reestablishment unit, configured to reestablish an RRC connection between a first anchor node and first UE according to the RRC connection reestablishment complete message received by the receiving unit, where the RRC connection reestablishment complete message is the RRC connection reestablishment complete message generated by the first UE according to an RRC connection reestablishment message sent by the second serving node, and the RRC connection reestablishment complete message is sent to the second serving node.

With reference to the fourth aspect, in a first implementation of the fourth aspect, the apparatus further includes:

a first sending unit, configured to: before the second serving node sends the RRC connection reestablishment message to the first UE, send a first user equipment identifier UEID and a next hop chaining count NCC of the first UE to which the first anchor node has established an RRC connection to the second serving node, where the receiving unit is specifically configured to receive an RRC connection reestablishment request message sent by the first UE, where the RRC connection reestablishment request message includes the first UEID; and that the second serving node generates the RRC connection reestablishment message according to the RRC connection reestablishment request message and sends the RRC connection reestablishment message to the first UE includes: obtaining, by the second serving node, the NCC according to the first UEID, generating the RRC connection reestablishment message including the NCC, and sending the RRC connection reestablishment message to the first UE, so that the first UE derives a new key according to the NCC.

With reference to the first implementation of the fourth aspect, in a second implementation of the fourth aspect, the first sending unit is specifically configured to:

after the first anchor node has established an RRC connection to the first UE, send the first user equipment identifier UEID and the next hop chaining count NCC of the first UE to which the first anchor node has established an RRC connection to the second serving node; or after the first anchor node receives a request message sent by the second serving node, send the first UEID and the NCC of the first UE to which the first anchor node has established an RRC connection to the second serving node.

With reference to the first implementation of the fourth aspect, in a third implementation of the fourth aspect, the apparatus further includes:

a signaling sending unit, configured to: after the first sending unit sends the first user equipment identifier UEID and the next hop chaining count NCC of the first UE to which the first anchor node has established an RRC connection to the second serving node, and after the RRC connection of the first UE is disconnected from the first anchor node, send signaling to the second serving node, where the signaling is used for the second serving node to release the NCC of the first UE according to the signaling.

With reference to the fourth aspect, in a fourth implementation of the fourth aspect, the apparatus further includes:

a second sending unit, configured to: before the second serving node sends the RRC connection reestablishment message to the first UE, send an identifier of a neighboring cell served by the first anchor node to the second serving node, where the RRC connection reestablishment request message includes an identifier of a source cell, so that the second serving node recognizes that the source cell is the neighboring cell served by the first anchor node or the source cell is a current cell, and sends fourth indication information to the first UE, to instruct the first UE to use an original key, or indicate that a key of the first UE does not change, or instruct the first UE to generate a new key by using a key KeNB of an evolved node B NodeB.

With reference to the fourth aspect, in a fifth implementation of the fourth aspect, the receiving unit is further configured to: before the second serving node receives the RRC connection reestablishment complete message sent by the first UE, receive the RRC connection reestablishment message and first indication information sent by the second serving node; and the apparatus further includes:

a recognition unit, configured to: recognize, according to the first indication information, that the RRC connection reestablishment message is an RRC message that a signaling radio bearer SRB0 bears, where the RRC message is processed by using an RRC layer entity of the first anchor node.

With reference to the fourth aspect, in a sixth implementation of the fourth aspect, the receiving unit is further configured to: before the second serving node receives the RRC connection reestablishment complete message sent by the first UE, receive the RRC connection reestablishment message sent by the second serving node, where the RRC connection reestablishment message carries first indication information, or a control plane signaling message that bears the RRC connection reestablishment message carries first indication information; and the apparatus further includes:

a recognition unit, configured to: recognize, according to the first indication information, that the RRC connection reestablishment message is an RRC message that a signaling radio bearer SRB0 bears, where the RRC message is processed by using an RRC layer entity of the first anchor node.

With reference to the fourth aspect, in a seventh implementation of the fourth aspect, the receiving unit is further configured to: before the second serving node receives the RRC connection reestablishment complete message sent by the first UE, receive a configuration parameter that is of the first UE and that is sent by the second serving node.

With reference to the fourth aspect, in an eighth implementation of the fourth aspect, the receiving unit is specifically configured to receive the RRC connection reestablishment complete message sent by the second serving node, where the RRC connection reestablishment complete message carries second indication information, or a control plane signaling message that bears the RRC connection reestablishment complete message carries second indication information; and the apparatus further includes:

a recognition unit, configured to recognize, according to the second indication information, that the RRC connection reestablishment complete message is an RRC message that a signaling radio bearer SRB1 bears.

With reference to the fourth aspect, in a ninth implementation of the fourth aspect, the receiving unit is further configured to receive second indication information sent by the second serving node; and the apparatus further includes:

a recognition unit, configured to recognize, according to the second indication information, that the RRC connection reestablishment complete message is an RRC message that a signaling radio bearer SRB1 bears.

With reference to the fourth aspect, in a tenth implementation of the fourth aspect, the receiving unit is specifically configured to receive a corresponding packet data convergence protocol protocol data unit PDCP PDU sent to the first anchor node after a radio link control RLC layer entity of the second serving node processes an RRC message that is sent by the first UE and that includes the RRC connection reestablishment complete message into the PDCP PDU, where the RRC message includes an RRC message that an SRB1 bears or an RRC message that an SRB2 bears, the RRC connection reestablishment complete message is an RRC message that an SRB1 bears; and the apparatus further includes:

a first packet data processing unit, configured to: process the RRC message that an SRB1 bears by using a first PDCP layer entity in the first anchor node, and send the processed RRC message to an RRC layer entity; and a second packet data processing unit, configured to: process the RRC message that an SRB2 bears by using a second PDCP layer entity in the first anchor node, and send the processed RRC message to the RRC layer entity.

With reference to the fourth aspect, in an eleventh implementation of the fourth aspect, the apparatus further includes:

a third sending unit, configured to send a packet data convergence protocol protocol data unit PDCP PDU corresponding to an RRC message to the second serving node, where the RRC message includes an RRC message that an SRB1 bears or an RRC message that an SRB2 bears, and the RRC message is used for a first radio link control RLC layer entity of the second serving node to process the RRC message that an SRB1 bears and send the processed RRC message to the first UE by using a Media Access Control MAC layer and a physical layer, or the RRC message is used for a second RLC layer entity of the second serving node to process the RRC message that an SRB2 bears and send the processed RRC message to the first UE by using a MAC layer and a physical layer.

According to a fifth aspect, a serving node is provided, where the serving node includes:

a transmitter;
a receiver; and
a processor, where
the transmitter is configured to broadcast a system message;
the receiver is configured to receive a random access message sent by first user equipment UE according to the system message;
the transmitter is further configured to send a random access response message to the first UE;
the receiver is further configured to receive an RRC connection request message sent by the first UE;
the processor is configured to generate an RRC connection establishment message according to the RRC connection request message received by the receiver;
the transmitter is further configured to send the RRC connection establishment message generated by the processor to the first UE;
the receiver is further configured to receive an RRC connection establishment complete message sent by the first UE; and
the transmitter is further configured to send the RRC connection establishment complete message to the first anchor node, to enable the first anchor node to establish an RRC connection to the first UE.

According to a sixth aspect, a serving node is provided, where the serving node includes:

a transmitter;
a receiver; and
a processor, where
the transmitter is configured to broadcast a system message;
the receiver is configured to receive a random access message sent by first user equipment UE according to the system message;
the transmitter is further configured to send a random access response message to the first UE;
the receiver is further configured to receive an RRC connection reestablishment request message sent by the first UE;
the processor is configured to generate an RRC connection reestablishment message according to the RRC connection reestablishment request message received by the receiver;
the transmitter is further configured to send the RRC connection reestablishment message generated by the processor to the first UE;
the receiver is further configured to receive an RRC connection reestablishment complete message sent by the first UE; and
the transmitter is further configured to send the RRC connection reestablishment complete message to a first anchor node, to enable the first anchor node to reestablish an RRC connection to the first UE.

According to a seventh aspect, an anchor node is provided, where the anchor node includes:

a receiver; and
a processor, where
the receiver is configured to receive an RRC connection establishment complete message sent by the serving node; and
the processor is configured to establish an RRC connection between the first anchor node and the first UE according to the RRC connection establishment complete message received by the receiver, where
the RRC connection establishment complete message is the RRC connection establishment complete message generated by the first UE according to an RRC connection establishment message sent by the serving node, and the RRC connection establishment complete message is sent to the serving node.

According to an eighth aspect, an anchor node is provided, where the anchor node includes:

a receiver; and
a processor, where
the receiver is configured to receive an RRC connection reestablishment complete message sent by the second serving node; and
the processor is configured to reestablish an RRC connection between the first anchor node and the first UE according to the RRC connection reestablishment complete message received by the receiver, where
the RRC connection reestablishment complete message is the RRC connection reestablishment complete message generated by the first UE according to an RRC connection reestablishment message sent by the serving node, and the RRC connection reestablishment complete message is sent to the serving node.

According to a ninth aspect, an RRC connection method is provided, where the method includes:

broadcasting, by a serving node, a system message;
receiving, by the serving node, a random access message sent by first user equipment UE according to the system message;
sending a random access response message to the first UE;
receiving, by the serving node, an RRC connection request message sent by the first UE;
generating, by the serving node, an RRC connection establishment message according to the RRC connection request message, and sending the RRC connection establishment message to the first UE;
receiving, by the serving node, the RRC connection establishment complete message sent by the first UE; and sending, by the serving node, the RRC connection establishment complete message to the first anchor node, to enable the first anchor node to establish an RRC connection to the first UE.

With reference to the ninth aspect, in a first implementation of the ninth aspect, the generating, by the serving node, an RRC connection establishment message according to the RRC connection request message includes: selecting, by the serving node, the first UE from at least one UE including the first UE according to a received RRC connection request message sent by the at least one UE, and generating the RRC connection establishment message of the first UE according to the RRC connection request message of the first UE.

With reference to the ninth aspect or the first implementation of the ninth aspect, in a second implementation of the ninth aspect, before the receiving, by the serving node, the RRC connection establishment complete message sent by the first UE, the method further includes:

sending a configuration parameter of the first UE and a UE identifier of the first UE to the first anchor node.

With reference to the second implementation of the ninth aspect, in a third implementation of the ninth aspect, the sending a configuration parameter of the first UE to the first anchor node includes: sending the RRC connection establishment message to the first anchor node, where the RRC connection establishment message includes the configuration parameter of the first UE, where the RRC connection establishment message carries first indication information, or a control plane signaling message that bears the RRC connection establishment message carries first indication information, where the first indication information is used for the first anchor node to recognize, according to the first indication information, that the RRC connection establishment message is an RRC message that a signaling radio bearer SRB0 bears, where the RRC message is processed by using an RRC layer entity of the first anchor node.

With reference to the second implementation of the ninth aspect, in a fourth implementation of the ninth aspect, the sending a configuration parameter of the first UE to the first anchor node includes: sending the RRC connection establishment message to the first anchor node, where the RRC connection establishment message includes the configuration parameter of the first UE; and the method further includes: sending, by the serving node, first indication information to the first anchor node, where the first indication information is used for the first anchor node to recognize, according to the first indication information, that the RRC connection establishment message is an RRC message that a signaling radio bearer SRB0 bears, where the RRC message is processed by using an RRC layer entity of the first anchor node.

With reference to the ninth aspect, in a fifth implementation of the ninth aspect, the sending, by the serving node, the RRC connection establishment complete message to the first anchor node includes: sending, by the serving node, second indication information to the first anchor node by adding the second indication information to the RRC connection establishment complete message or by adding the second indication information to a control plane signaling message that bears the RRC connection establishment complete message, where the second indication information is used for the first anchor node to recognize, according to the second indication information, that the RRC connection establishment complete message is an RRC message that a signaling radio bearer SRB1 bears.

With reference to the ninth aspect, in a sixth implementation of the ninth aspect, the method further includes: sending, by the serving node, second indication information to the first anchor node, where the second indication information is used for the first anchor node to recognize, according to the second indication information, that the RRC connection establishment complete message is an RRC message that a signaling radio bearer SRB1 bears.

With reference to the ninth aspect or any one of the first to sixth implementations of the ninth aspect, in a seventh implementation of the ninth aspect, the method further includes: processing, by a radio link control RLC layer entity of the serving node, an RRC message that is sent by the first UE and that includes the RRC connection establishment complete message into a corresponding packet data convergence protocol protocol data unit PDCP PDU, and sending the PDCP PDU to the first anchor node, where the RRC message includes an RRC message that a signaling radio bearer SRB1 bears or an RRC message that an SRB2 bears, the RRC connection establishment complete message is an RRC message that an SRB1 bears, and the RRC message is used for a first PDCP layer entity in the first anchor node to process the RRC message that an SRB1 bears and send the processed RRC message to the RRC layer entity, or the RRC message is used for a second PDCP layer entity in the first anchor node to process the RRC message that an SRB2 bears and send the processed RRC message to the RRC layer entity.

With reference to the ninth aspect or any one of the first to seventh implementations of the ninth aspect, in an eighth implementation of the ninth aspect, the method further includes: receiving, by the serving node, a packet data convergence protocol protocol data unit PDCP PDU corresponding to an RRC message sent by the first anchor node, where the RRC message includes an RRC message that a signaling radio bearer SRB1 bears or an RRC message that an SRB2 bears, and the RRC message is used for a first radio link control RLC layer entity of the serving node to process the RRC message that an SRB1 bears and send the processed RRC message to the first UE by using a Media Access Control MAC layer and a physical layer, or the RRC message is used for a second RLC layer entity of the serving node to process the RRC message that an SRB2 bears and send the processed RRC message to the first UE by using a MAC layer and a physical layer.

According to a tenth aspect, an RRC reconnection method is provided, where the method includes:

broadcasting, by a second serving node, a system message;

receiving, by the second serving node, a random access message sent by first user equipment UE according to the system message;

sending a random access response message to the first UE;

receiving, by the second serving node, an RRC connection reestablishment request message sent by the first UE;

generating, by the second serving node, an RRC connection reestablishment message according to the RRC connection reestablishment request message, and sending the RRC connection reestablishment message to the first UE;

receiving, by the second serving node, an RRC connection reestablishment complete message sent by the first UE; and sending, by the second serving node, the RRC connection reestablishment complete message to a first anchor node, to enable the first anchor node to reestablish an RRC connection to the first UE.

With reference to the tenth aspect, in a first implementation of the tenth aspect, before the sending the RRC connection reestablishment message to the first UE, the method further includes:

obtaining, by the second serving node, a first user equipment identifier UEID and a next hop chaining count NCC of the first UE to which the first anchor node has established an RRC connection;

the receiving, by the second serving node, an RRC connection reestablishment request message sent by the first UE includes: receiving, by the second serving node, the RRC connection reestablishment request message sent by the first UE, where the RRC connection reestablishment request message includes the first UEID; and the generating, by the second serving node, an RRC connection reestablishment message according to the RRC connection reestablishment request message, and sending the RRC connection reestablishment message to the first UE includes: obtaining, by the second serving node, the NCC according to the first UEID, generating the RRC connection reestablishment message including the NCC, and sending the RRC connection reestablishment message to the first UE, so that the first UE derives a new key according to the NCC.

With reference to the first implementation of the tenth aspect, in a second implementation of the tenth aspect, the obtaining, by the second serving node, a first user equipment identifier UEID and a next hop chaining count NCC of the first UE to which the first anchor node has established an RRC connection includes:

after the first anchor node has established an RRC connection to the first UE, obtaining, by the second serving node, the first user equipment identifier UEID and the next hop chaining count NCC of the first UE to which the first anchor node has established an RRC connection, or after the second serving node sends a request message to the first anchor node, receiving the first UEID and the NCC of the first UE to which an RRC connection has been established that are sent by the first anchor node.

With reference to the first implementation of the tenth aspect, in a third implementation of the tenth aspect, after the obtaining, by the second serving node, the first user equipment identifier UEID and the next hop chaining count NCC of the first UE to which the first anchor node has established an RRC connection, the method further includes:

after the RRC connection of the first UE is disconnected from the first anchor node, receiving, by the second serving node, signaling sent by the first anchor node, so that the second serving node releases the NCC of the first UE according to the signaling.

With reference to the tenth aspect, in a fourth implementation of the tenth aspect, before the sending the RRC connection reestablishment message to the first UE, the method further includes:

obtaining, by the second serving node, an identifier of a neighboring cell served by the first anchor node, where the RRC connection reestablishment request message includes an identifier of a source cell, so that the second serving node recognizes that the source cell is the neighboring cell served by the first anchor node or the source cell is a current cell, and sends fourth indication information to the first UE, where the fourth indication information is used to instruct the first UE to use an original key, or indicate that a key of the first UE does not change, or instruct the first UE to generate a new key by using a key KeNB of an evolved node B NodeB.

With reference to the tenth aspect, in a fifth implementation of the tenth aspect, before the receiving, by the second serving node, an RRC connection reestablishment complete message sent by the first UE, the method further includes:

sending, by the second serving node, the RRC connection reestablishment message and first indication information to the first anchor node, where the first indication information is used for the first anchor node to recognize, according to the first indication information, that the RRC connection reestablishment message is an RRC message that a signaling radio bearer SRB0 bears, where the RRC message is processed by using an RRC layer entity of the first anchor node.

With reference to the tenth aspect, in a sixth implementation of the tenth aspect, before the receiving, by the second serving node, an RRC connection reestablishment complete message sent by the first UE, the method further includes:

sending, by the second serving node, the RRC connection reestablishment message to the first anchor node, where the RRC connection reestablishment message carries first indication information, or a control plane signaling message that bears the RRC connection reestablishment message carries first indication information, where the first indication information is used for the first anchor node to recognize, according to the first indication information, that the RRC connection reestablishment message is an RRC message that a signaling radio bearer SRB0 bears, where the RRC message is processed by using an RRC layer entity of the first anchor node.

With reference to the tenth aspect, in a seventh implementation of the tenth aspect, before the receiving, by the second serving node, an RRC connection reestablishment complete message sent by the first UE, the method further includes: sending a configuration parameter of the first UE to the first anchor node.

With reference to the tenth aspect, in an eighth implementation of the tenth aspect, the sending, by the second serving node, the RRC connection reestablishment complete message to a first anchor node includes: sending, by the second serving node, second indication information to the first anchor node by adding the second indication information to the RRC connection reestablishment complete message or adding the second indication information to a control plane signaling message that bears the RRC connection reestablishment complete message, where the second indication information is used for the first anchor node to recognize, according to the second indication information, that the RRC connection reestablishment complete message is an RRC message that a signaling radio bearer SRB1 bears.

With reference to the tenth aspect, in a ninth implementation of the tenth aspect, the method further includes: sending, by the serving node, second indication information to the first anchor node, where the second indication information is used for the first anchor node to recognize, according to the second indication information, that the RRC connection reestablishment complete message is an RRC message that a signaling radio bearer SRB1 bears.

With reference to the tenth aspect, in a tenth implementation of the tenth aspect, the method further includes:

processing, by a radio link control RLC layer entity of the second serving node, an RRC message that is sent by the first UE and that includes the RRC connection reestablishment complete message into a corresponding packet data convergence protocol protocol data unit PDCP PDU, where the RRC message includes an RRC message that an SRB1 bears or an RRC message that an SRB2 bears, the RRC connection reestablishment complete message is an RRC message that an SRB1 bears, and the RRC message is used for a first PDCP layer entity in the first anchor node to process the RRC message that an SRB1 bears and send the processed. RRC message to an RRC layer entity, or the RRC message is used for a second PDCP layer entity in the first anchor node to process the RRC message that an SRB2 bears and send the processed RRC message to the RRC layer entity.

With reference to the tenth aspect, in an eleventh implementation of the tenth aspect, the method further includes:

receiving, by the second serving node, a packet data convergence protocol protocol data unit PDCP PDU corresponding to an RRC message sent by the first anchor node, where the RRC message includes an RRC message that an SRB1 bears or an RRC message that an SRB2 bears, and the RRC message is used for a first radio link control RLC layer entity of the second serving node to process the RRC message that an SRB1 bears and send the processed RRC message to the first UE by using a Media Access Control MAC layer and a physical layer, or the RRC message is used for a second RLC layer entity of the second serving node to process the RRC message that an SRB2 bears and send the processed RRC message to the first UE by using a MAC layer and a physical layer.

According to an eleventh aspect, an RRC connection method is provided, where the method includes:

receiving, by a first anchor node, an RRC connection establishment complete message sent by the serving node; and establishing an RRC connection between the first anchor node and the first UE according to the RRC connection establishment complete message, where the RRC connection establishment complete message is the RRC connection establishment complete message generated by the first UE according to an RRC connection establishment message sent by the serving node, and the RRC connection establishment complete message is sent to the serving node.

With reference to the eleventh aspect, in a first implementation of the eleventh aspect, the method further includes:

before the serving node receives the RRC connection establishment complete message sent by the first UE, receiving, by the first anchor node, a configuration parameter and a UE identifier of the first UE that are sent by the serving node.

With reference to the first implementation of the eleventh aspect, in a second implementation of the eleventh aspect, the receiving, by the first anchor node, a configuration parameter that is of the first UE and that is sent by the serving node includes: receiving, by the first anchor node, the RRC connection establishment message sent by the serving node, where the RRC connection establishment message includes the configuration parameter of the first UE; and the RRC connection establishment message carries first indication information, or a control plane signaling message that bears the RRC connection establishment message carries first indication information; and the method further includes: recognizing, by the first anchor node according to the first indication information, that the RRC connection establishment message is an RRC message that a signaling radio bearer SRB0 bears, where the RRC message is processed by using an RRC layer entity of the first anchor node.

With reference to the first implementation of the eleventh aspect, in a third implementation of the eleventh aspect, the receiving, by the first anchor node, a configuration parameter that is of the first UE and that is sent by the serving node includes: receiving, by the first anchor node, the RRC connection establishment message sent by the serving node, where the RRC connection establishment message includes the configuration parameter of the first UE; and the method further includes: receiving, by the first anchor node, first indication information sent by the serving node, and recognizing, by the first anchor node according to the first indication information, that the RRC connection establishment message is an RRC message that a signaling radio bearer SRB0 bears, where the RRC message is processed by using an RRC layer entity of the first anchor node.

With reference to the eleventh aspect, in a fourth implementation of the eleventh aspect, the receiving the RRC connection establishment complete message sent by the serving node includes: receiving, by the first anchor node, a control plane signaling message that is sent by the serving node and that bears the RRC connection establishment complete message, where the RRC connection establishment complete message carries second indication information, or the control plane signaling message carries second indication information, and recognizing, by the first anchor node according to the second indication information, that the RRC connection establishment complete message is an RRC message that an SRB1 bears.

With reference to the eleventh aspect, in a fifth implementation of the eleventh aspect, the method further includes: receiving, by the first anchor node, second indication information sent by the serving node, and recognizing, by the first anchor node according to the second indication information, that the RRC connection establishment complete message is an RRC message that an SRB1 bears.

With reference to the eleventh aspect, in a sixth implementation of the eleventh aspect, the method further includes: receiving, by the first anchor node, a corresponding packet data convergence protocol protocol data unit PDCP PDU sent after a radio link control RLC layer entity of the serving node processes an RRC message that is sent by the first UE and that includes the RRC connection establishment complete message into the PDCP PDU, where the RRC message includes an RRC message that an SRB1 bears or an RRC message that an SRB2 bears, and the RRC connection establishment complete message is an RRC message that an SRB1 bears; and processing, by a first PDCP layer entity in the first anchor node, the RRC message that an SRB1 bears, and sending the processed RRC message to an RRC layer entity, or processing, by a second PDCP layer entity in the first anchor node, the RRC message that an SRB2 bears, and sending the processed RRC message to the RRC layer entity.

With reference to the eleventh aspect or any one of the first to sixth implementations of the eleventh aspect, in a seventh implementation of the eleventh aspect, the method further includes: sending, by the first anchor node, a packet data convergence protocol protocol data unit PDCP PDU corresponding to an RRC message to the serving node, where the RRC message includes an RRC message that an SRB1 bears or an RRC message that an SRB2 bears, and the RRC message is used for a first radio link control RLC layer entity of the serving node to process the RRC message that an SRB1 bears and send the processed RRC message to the first UE by using a Media Access Control MAC layer and a physical layer, or the RRC message is used for a second RLC layer entity of the serving node to process the RRC message that an SRB2 bears and send the processed RRC message to the first UE by using a MAC layer and a physical layer.

According to a twelfth aspect, an RRC reconnection method is provided, where the method includes:

receiving, by a first anchor node, an RRC connection reestablishment complete message sent by a second serving node; and reestablishing an RRC connection between the first anchor node and first UE according to the RRC connection reestablishment complete message, where the RRC connection reestablishment complete message is the RRC connection reestablishment complete message generated by the first UE according to an RRC connection reestablishment message sent by the second serving node, and the RRC connection reestablishment complete message is sent to the second serving node.

With reference to the twelfth aspect, in a first implementation of the twelfth aspect, the method further includes:

before the second serving node sends the RRC connection reestablishment message to the first UE, sending, by the first anchor node, a first user equipment identifier UEID and a next hop chaining count NCC of the first UE to which the first anchor node has established an RRC connection to the second serving node;

the receiving, by the second serving node, an RRC connection reestablishment request message sent by the first UE includes: receiving, by the second serving node, an RRC connection reestablishment request message sent by the first UE, where the RRC connection reestablishment request message includes the first UEID; and the generating, by the second serving node, the RRC connection reestablishment message according to the RRC connection reestablishment request message, and sending the RRC connection reestablishment message to the first UE includes: obtaining, by the second serving node, the NCC according to the first UEID, generating the RRC connection reestablishment message including the NCC, and sending the RRC connection reestablishment message to the first UE, so that the first UE derives a new key according to the NCC.

With reference to the first implementation of the twelfth aspect, in a second implementation of the twelfth aspect, the sending, by the first anchor node, a first user equipment identifier UEID and a next hop chaining count NCC of the first UE to which the first anchor node has established an RRC connection to the second serving node includes:

after the first anchor node has established an RRC connection to the first UE, sending, by the first anchor node, the first user equipment identifier UEID and the next hop chaining count NCC of the first UE to which the first anchor node has established an RRC connection to the second serving node; or after the first anchor node receives a request message sent by the second serving node, sending the first UEID and the NCC of the first UE to which the first anchor node has established an RRC connection to the second serving node.

With reference to the first implementation of the twelfth aspect, in a third implementation of the twelfth aspect, after the sending, by the first anchor node, a first user equipment identifier UEID and a next hop chaining count NCC of the first UE to which the first anchor node has established an RRC connection to the second serving node, the method further includes:

after the RRC connection of the first UE is disconnected from the first anchor node, sending, by the first anchor node, signaling to the second serving node, where the signaling is used for the second serving node to release the NCC of the first UE according to the signaling.

With reference to the twelfth aspect, in a fourth implementation of the twelfth aspect, before the sending, by the second serving node, the RRC connection reestablishment message to the first UE, the method further includes:

sending, by the first anchor node, an identifier of a neighboring cell served by the first anchor node to the second serving node, where the RRC connection reestablishment request message induces an identifier of a source cell, so that the second serving node recognizes that the source cell is the neighboring cell served by the first anchor node or the source cell is a current cell, and sends fourth indication information to the first UE, to instruct the first UE to use an original key, or indicate that a key of the first UE does not change, or instruct the first UE to generate a new key by using a key KeNB of an evolved node B NodeB.

With reference to the twelfth aspect, in a fifth implementation of the twelfth aspect, before the receiving, by the second serving node, an RRC connection reestablishment complete message sent by the first UE, the method further includes: receiving, by the first anchor node, the RRC connection reestablishment message and first indication information sent by the second serving node, and recognizing, by the first anchor node according to the first indication information, that the RRC connection reestablishment message is an RRC message that a signaling radio bearer SRB0 bears, where the RRC message is processed by using an RRC layer entity of the first anchor node.

With reference to the twelfth aspect, in a sixth implementation of the twelfth aspect, before the receiving, by the second serving node, an RRC connection reestablishment complete message sent by the first UE, the method further includes: receiving, by the first anchor node, the RRC connection reestablishment message sent by the second serving node, where the RRC connection reestablishment message carries first indication information, or a control plane signaling message that bears the RRC connection reestablishment message carries first indication information, where the first indication information is used for the first anchor node to recognize, according to the first indication information, that the RRC connection reestablishment message is an RRC message that a signaling radio bearer SRB0 bears, where the RRC message is processed by using an RRC layer entity of the first anchor node.

With reference to the twelfth aspect, in a seventh implementation of the twelfth aspect, before the receiving, by the second serving node, an RRC connection reestablishment complete message sent by the first UE, the method further includes: receiving, by the first anchor node, a configuration parameter that is of the first UE and that is sent by the second serving node.

With reference to the twelfth aspect, in an eighth implementation of the twelfth aspect, the receiving, by a first anchor node, an RRC connection reestablishment complete message sent by a second serving node includes: receiving, by the first anchor node, the RRC connection reestablishment complete message sent by the second serving node, where the RRC connection reestablishment complete message carries second indication information, or a control plane signaling message that bears the RRC connection reestablishment complete message carries second indication information; and recognizing, by the first anchor node according to the second indication information, that the RRC connection reestablishment complete message is an RRC message that a signaling radio bearer SRB1 bears.

With reference to the twelfth aspect, in a ninth implementation of the twelfth aspect, the method further includes: receiving, by the first anchor node, second indication information sent by the second serving node, and recognizing, by the first anchor node, according to the second indication information, that the RRC connection reestablishment complete message is an RRC message that a signaling radio bearer SRB1 bears.

With reference to the twelfth aspect, in a tenth implementation of the twelfth aspect, the method further includes:
  receiving, by the first anchor node, a corresponding packet data convergence protocol protocol data unit PDCP PDU sent to the first anchor node after a radio link control RLC layer entity of the second serving node processes an RRC message that is sent by the first UE and that includes the RRC connection reestablishment complete message into the PDCP PDU, where the RRC message includes an RRC message that an SRB1 bears or an RRC message that an SRB2 bears, and the RRC connection reestablishment complete message is an RRC message that an SRB1 bears; and processing, by a first PDCP layer entity in the first anchor node, the RRC message that an SRB1 bears, and sending the processed RRC message to an RRC layer entity, or processing, by a second PDCP layer entity in the first anchor node, the RRC message that an SRB2 bears, and sending the processed RRC message to the RRC layer entity.

With reference to the twelfth aspect, in an eleventh implementation of the twelfth aspect, the method further includes:
  sending, by the first anchor node, a packet data convergence protocol protocol data unit PDCP PDU corresponding to an RRC message to the second serving node, where the RRC message includes an RRC message that an SRB1 bears or an RRC message that an SRB2 bears, and the RRC message is used for a first radio link control RLC layer entity of the second serving node to process the RRC message that an SRB1 bears and send the processed RRC message to the first UE by using a Media Access Control MAC layer and a physical layer, or the RRC message is used for a second RLC layer entity of the second serving node to process the RRC message that an SRB2 bears and send the processed RRC message to the first UE by using a MAC layer and a physical layer.

In the RRC connection method provided in the embodiments of the present invention, first, a serving node broadcasts a system message, receives a random access message sent by first UE according to the system message, and then sends a random access response message to the first UE. The serving node receives an RRC connection request message sent by the first UE. The serving node generates an RRC connection establishment message according to the RRC connection request message, and sends the RRC connection establishment message to the first UE. The serving node receives an RRC connection establishment complete message sent by the first UE. The serving node sends the RRC connection establishment complete message to the first anchor node, so as to establish an RRC connection between the first anchor node and the first UE. As may be seen from above, in the embodiments of the present invention, an RRC connection is established between the first anchor node and the first UE. Therefore, when the serving node of the UE is switched, a connection between an MME and the first anchor node does not change. When the MME needs to send a paging message, the MME does not need to send the paging message to all base stations in a TA area that corresponds to the paging message, thereby effectively reducing signaling load of a core network.

DESCRIPTION OF EMBODIMENTS

The technical solutions of the present invention are further described in detail with reference to accompanying drawings and embodiments as follows:

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

To provide thorough understanding of the present invention, the following further describes the embodiments of the present invention in detail with reference to the accompanying drawings. The foregoing embodiments are not intended to limit the protection scope of the present invention.

Figure 1:
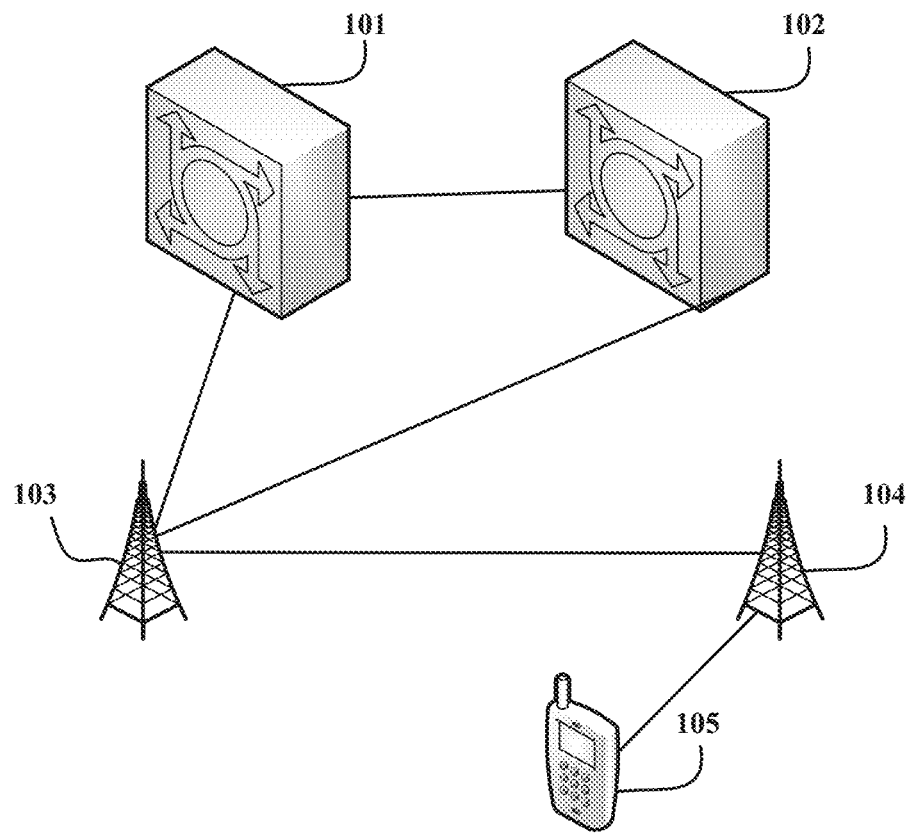
FIG. 1 is a schematic diagram of a network architecture according to an embodiment of the present invention.

FIG. 1 is a schematic diagram of a network architecture according to an embodiment of the present invention. The network architecture includes a mobility management entity (MME) 101, a serving gateway (SGW) 102, an anchor node (AN) 103, a serving node (SN) 104, and user equipment (UE) 105. The anchor node 103 may be an existing base station, or may be a newly set up network element. The serving node 104 is a base station that serves the UE 105. A difference from the prior art is that in the prior art, the serving node 104 directly establishes a connection to the MME 101, whereas in the present invention, a connection is not directly established between the serving node 104 and the MME 101. Instead, the serving node 104 establishes a connection to the anchor node 103, and the anchor node 103 establishes a connection to the MME 101, so as to implement establishment of a connection between the serving node 104 and the MME 101 by using the anchor node 103. In this embodiment of the present invention, the MME 101 and the SGW 102 of a core network respectively establish an S1-C control plane interface and an S1-U user plane interface to the anchor node 103. The anchor node 103 and the serving node 104 are connected by using a signal tunnel (backhaul) to establish an interface. The interface may be specifically an enhanced X2 interface, or may be another type of interface. A radio link connection is established between the UE 105 and the serving node 104.

In this embodiment of the present invention, the serving node 104 does not separately process an RRC message. Instead, the anchor node 103 and the serving node 104 process an RRC message together. That is, according to different types of RRC messages, the anchor node 103 processes some RRC messages, and the serving node 104 processes the rest RRC messages, so as to implement separation of RRC functions on the two nodes. Specifically, the anchor node 103 may include an RRC protocol entity that is used to process an RRC message that an SRB bears and an RRC message that an SRB2 bears, a first packet data convergence protocol (PDCP) protocol entity that is used to process an RRC message that an SRB1 bears, and a second PDCP protocol entity that is used to process an RRC message that an SRB2 bears, so that the anchor node 103 has functions of an SRB1 and an SRB2 of the UE 105. That is, the SRB1 and the SRB2 of the UE 105 terminate at the anchor node 103. A protocol stack of the serving node 104 includes RLC protocol entities corresponding to a DRB, the SRB1, and the SRB2 of the UE 105. Specifically, an RLC protocol entity of the serving node 104 includes a first RLC layer entity that is used to process an RRC message that an SRB1 bears, a second RLC layer entity that is used to process an RRC message that an SRB2 bears, and a MAC protocol entity and a PHY protocol entity that correspond to the UE 105. The protocol stack of the serving node 104 may further include an RRC protocol entity that is used to process an RRC message that an SRB0 hears. That is, the RRC protocol entity of the selling node 104 is used to generate and send a common RRC message such as an MIB, an SIB, a paging message, and MBMS control information, so that the serving node 104 has a function of processing an RRC message that an SRB0 bears, a system broadcast message responsible for processing a BCCH service, a cell paging message of a PCCH service, and some RRC messages such as an RRC connection request message and an RRC connection establishment message of an RRC connection establishment process and an RRC connection reestablishment process of UE of an optional CCCH service.

The RRC message that an SRB1 bears may be specifically an RRC message that exists when establishment of a connection is completed, and the RRC message that an SRB2 bears may be specifically an RRC message that exists after establishment of a connection is completed.

In addition, an RRC message processing procedure corresponding to the network architecture may include the following three types.

A first-type RRC message processing procedure is a process of processing a UE-dedicated downlink DL RRC message. The DL RRC message includes an RRC message that an SRB1 bears and an RRC message that an SRB2 bears. Specifically, the RRC protocol entity of the anchor node 103 generates an RRC message that an SRB1 bears or an RRC message that an SRB2 bears of UE, and then delivers the RRC message to a PDCP protocol entity corresponding to an SRB1 or an SRB2 for processing. A PDCP protocol entity of the anchor node forms a PDCP PDU. The RRC message is sent to the serving node by using an interface between the anchor node and the serving node. After receiving the RRC message, the serving node obtains the PDCP PDU through parsing. An RLC protocol entity corresponding to an SRB1 or an SRB2 on the serving node then processes the RRC message. After the RLC protocol entity of the serving node processes the RRC message, a MAC layer and a PHY layer of the serving node then process the RRC message and send the processed RRC message to the UE.

A second-type RRC message processing procedure is a process of processing a UE-dedicated uplink UL RRC message. The UL RRC message includes an RRC message that an SRB1 bears and an RRC message that an SRB2 bears. Specifically, after receiving an RRC message that an SRB1 bears or an RRC message that an SRB2 bears of UE, the serving node delivers the RRC message to an RLC protocol entity corresponding to an SRB1 or an SRB2 for processing. The RLC protocol entity of the serving node forms a PDCP PDU. The RRC message is sent to the anchor node by using an interface between the serving node and the anchor node. After receiving the RRC message, the anchor node obtains the PDCP PDU through parsing. A PDCP protocol entity corresponding to an SRB1 or an SRB2 on the anchor node then processes the RRC message. After the PDCP protocol entity processes the RRC message, the processed RRC message is sent to an RRC layer entity.

A third-type RRC message processing procedure is a process of processing a common RRC message of UE. The common RRC message includes an RRC message that an SRB0 bears. There are multiple types of common RRC messages, for example, a system broadcast message of a BCCH service, a cell common DL RRC message (paging, broadcast) of a PCCH service, and an RRC message that an SRB0 bears in a process of connection establishment and connection reestablishment of a CCCH service. The serving node processes the RRC message that an SRB0 bears.

The network architecture shown in FIG. 1 not only includes the serving node 104, but also includes the anchor node 103. The anchor node 103 and the serving node 104 process an RRC message of the UE 105 together. The MME 101 does not establish an S1 interface connection to the serving node 104. Therefore, when the serving node of the UE 105 is switched, an RRC connection of the UE is kept at the anchor node 103, and the S1 connection between the MME 101 and the anchor node 103 does not change. Therefore, a switching process does not cause corresponding switching signaling. In addition, when the MME 101 needs to send a paging message, the MME 101 only needs to send the paging message to the anchor node 103 or all base stations that are in a TA area that corresponds to the paging message and that have the S1 interface connection to the MME 101. The MME 101 does not establish the S1 interface connection to the serving node 104. Therefore, the MME 101 does not need to send the paging message to the serving node 104. Correspondingly, an increase in signaling is not caused due to dense deployment of the serving nodes 104, thereby effectively reducing signaling load of a core network.

Figure 2:
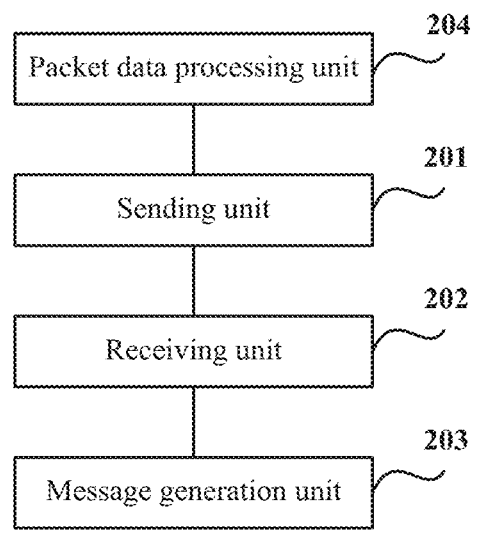
FIG. 2 is a schematic apparatus structural diagram of an RRC connection apparatus according to Embodiment 1 of the present invention.

FIG. 2 is a schematic apparatus structural diagram of an RRC connection apparatus according to Embodiment 1 of the present invention. The apparatus is disposed on a serving node, and the apparatus includes a sending unit 201, a receiving unit 202, and a message generation unit 203.

The sending unit 201 is configured to broadcast a system message.

The receiving unit 202 is configured to receive a random access message sent by first user equipment UE according to the system message sent by the sending unit.

The sending unit 201 is further configured to send a random access response message to the first UE according to the random access message received by the receiving unit 202.

The receiving unit 202 is further configured to receive an RRC connection request message sent by the first UE according to the random access response message sent by the sending unit 201.

The message generation unit 203 is configured to generate an RRC connection establishment message according to the RRC connection request message received by the receiving unit 202.

The sending unit 201 is further configured to send the RRC connection establishment message generated by the message generation unit 203 to the first UE.

The receiving unit 202 is further configured to receive an RRC connection establishment complete message sent by the first UE.

The sending unit 201 is further configured to send the RRC connection establishment complete message received by the receiving unit 202 to a first anchor node, to enable the first anchor node to establish an RRC connection to the first UE.

Preferably, the message generation unit 203 includes a selection subunit and a message generation subunit.

The selection subunit is configured to select the first UE from at least one UE including the first UE according to an RRC connection request message that is sent by the at least one UE and that is received by the receiving unit 202.

The message generation subunit is configured to generate the RRC connection establishment message of the first UE according to the RRC connection request message of the first UE selected by the selection subunit.

Preferably, the sending unit 201 is further configured to: before the receiving unit 202 receives the RRC connection establishment complete message sent by the first UE, send a configuration parameter of the first UE and a UE identifier of the first UE to the first anchor node.

Preferably, the sending unit 201 is specifically configured to send the RRC connection establishment message to the first anchor node. The RRC connection establishment message includes the configuration parameter of the first UE.

The RRC connection establishment message carries first indication information, or a control plane signaling message that bears the RRC connection establishment message carries first indication information. The first indication information is used for the first anchor node to recognize, according to the first indication information, that the RRC connection establishment message is an RRC message that a signaling radio bearer SRB0 bears. The RRC message is processed by using an RRC layer entity of the first anchor node.

Preferably, the sending unit 201 is specifically configured to send the RRC connection establishment message to the first anchor node. The RRC connection establishment message includes the configuration parameter of the first UE.

The sending unit 201 is further configured to send first indication information to the first anchor node. The first indication information is used for the first anchor node to recognize, according to the first indication information, that the RRC connection establishment message is an RRC message that a signaling radio bearer SRB0 bears. The RRC message is processed by using an RRC layer entity of the first anchor node.

Preferably, the sending unit 201 is specifically configured to send second indication information to the first anchor node by adding the second indication information to the RRC connection establishment complete message or by adding the second indication information to a control plane signaling message that bears the RRC connection establishment complete message. The second indication information is used for the first anchor node to recognize, according to the second indication information, that the RRC connection establishment complete message is an RRC message that a signaling radio bearer SRB1 bears.

Preferably, the sending unit 201 is further configured to send second indication information to the first anchor node. The second indication information is used for the first anchor node to recognize, according to the second indication information, that the RRC connection establishment complete message is an RRC message that a signaling radio bearer SRB1 bears.

Preferably, the apparatus further includes a packet data processing unit 204.

The packet data processing unit 204 is configured to process, by using a radio link control RLC layer entity, an RRC message that is sent by the first UE and that includes the RRC connection establishment complete message into a corresponding packet data convergence protocol protocol data unit PDCP PDU and send the PDCP PDU to the first anchor node. The RRC message includes an RRC message that a signaling radio bearer SRB1 bears or an RRC message that an SRB2 bears, the RRC connection establishment complete message is an RRC message that an SRB1 bears, and the RRC message is used for a first PDCP layer entity in the first anchor node to process the RRC message that an SRB1 bears and send the processed RRC message to the RRC layer entity, or the RRC message is used for a second PDCP layer entity in the first anchor node to process the RRC message that an SRB2 bears and send the processed RRC message to the RRC layer entity.

Preferably, the receiving unit 202 is specifically configured to receive a packet data convergence protocol protocol data unit PDCP PDU corresponding to an RRC message sent by the first anchor node. The RRC message includes an RRC message that a signaling radio bearer SRB1 bears or an RRC message that an SRB2 bears, and the RRC message is used for a first radio link control RLC layer entity of the serving node to process the RRC message that an SRB1 bears and send the processed RRC message to the first UE by using a Media Access Control MAC layer and a physical layer, or the RRC message is used for a second RLC layer entity of the serving node to process the RRC message that an SRB2 bears and send the processed RRC message to the first UE by using a MAC layer and a physical layer.

Figure 3:
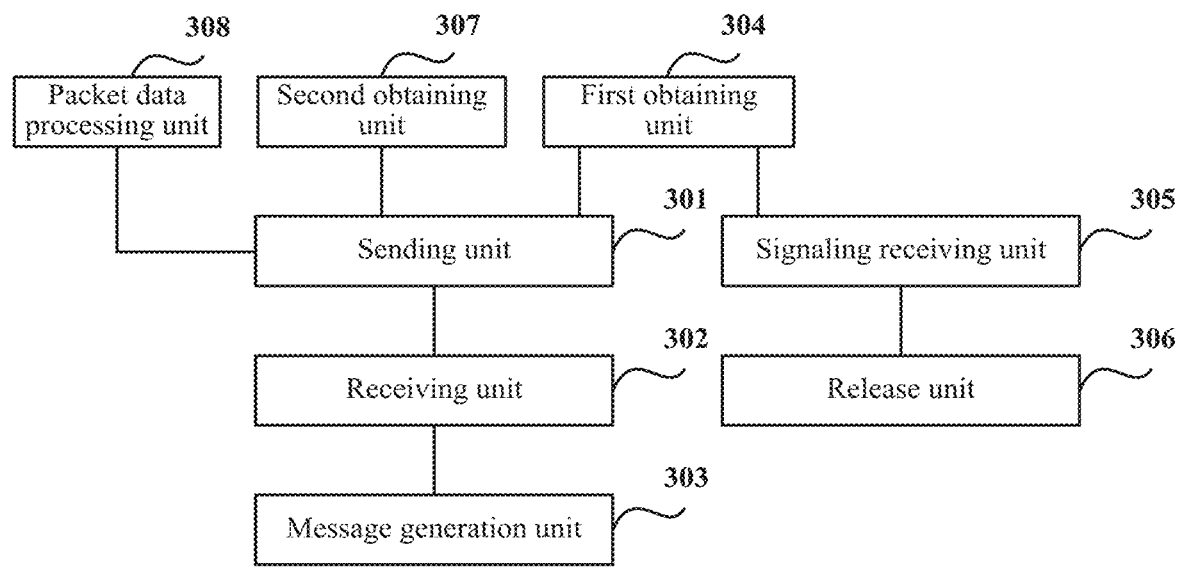
FIG. 3 is a schematic apparatus structural diagram of an RRC reconnection apparatus according to Embodiment 2 of the present invention.

FIG. 3 is a schematic apparatus structural diagram of an RRC reconnection apparatus according to Embodiment 2 of the present invention. The apparatus is disposed on a serving node, and the apparatus includes a sending unit 301, a receiving unit 302, and a message generation unit 303.

The sending unit 301 is configured to broadcast a system message.

The receiving unit 302 is configured to receive a random access message sent by first user equipment UE according to the system message sent by the sending unit 301.

The sending unit 301 is further configured to send a random access response message to the first UE according to the random access message received by the receiving unit 302.

The receiving unit 302 is further configured to receive an RRC connection reestablishment request message sent by the first UE according to the random access response message sent by the sending unit 301.

The message generation unit 303 is configured to generate an RRC connection reestablishment message according to the RRC connection reestablishment request message received by the receiving unit 302.

The sending unit 301 is further configured to send the RRC connection reestablishment message generated by the message generation unit 303 to the first UE.

The receiving unit 302 is further configured to receive an RRC connection reestablishment complete message sent by the first UE according to the RRC connection reestablishment message sent by the sending unit 301.

The sending unit 301 is further configured to send the RRC connection reestablishment complete message received by the receiving unit 302 to a first anchor node, to enable the first anchor node to reestablish an RRC connection to the first UE.

Preferably, the apparatus further includes a first obtaining unit 304.

The first obtaining unit 304 is configured to: before the sending unit 301 sends the RRC connection reestablishment message to the first UE, obtain a first user equipment identifier UEID and a next hop chaining count NCC of the first UE to which the first anchor node has established an RRC connection.

The receiving unit 302 is specifically configured to receive the RRC connection reestablishment request message sent by the first UE. The RRC connection reestablishment request message includes the first UEID.

The message generation unit 303 is specifically configured to obtain, according to the first UEID received by the receiving unit 302, the NCC obtained by the first obtaining unit 304, and generate the RRC connection reestablishment message including the NCC.

The sending unit 301 is specifically configured to send the RRC connection reestablishment message generated by the message generation unit 303 to the first UE, so that the first UE derives a new key according to the NCC.

Preferably, the first obtaining unit 304 is specifically configured to:

after the first anchor node has established an RRC connection to the first UE, obtain the first user equipment identifier UEID and the next hop chaining count NCC of the first UE to which the first anchor node has established an RRC connection; or after a request message is sent to the first anchor node, receive the first UEID and the NCC of the first UE to which an RRC connection has been established that are sent by the first anchor node.

Preferably, the apparatus further includes a signaling receiving unit 305 and a release unit 306.

The signaling receiving unit 305 is configured to: after the first obtaining unit 304 obtains the first user equipment identifier UEID and the next hop chaining count NCC of the first UE to which the first anchor node has established an RRC connection, and after the RRC connection of the first UE is disconnected from the first anchor node, receive signaling sent by the first anchor node.

The release unit 306 is configured to release the NCC of the first UE according to the signaling received by the signaling receiving unit 305.

Preferably, the apparatus further includes a second obtaining unit 307.

The second obtaining unit 307 is configured to: before the sending unit 301 sends the RRC connection reestablishment message to the first UE, obtain an identifier of a neighboring cell served by the first anchor node.

The sending unit 301 is further configured to: when it is recognized, according to an identifier of a source cell included in the RRC connection reestablishment request message received by the receiving unit 302, that the source cell is the neighboring cell served by the first anchor node or the source cell is a current cell, send fourth indication information to the first UE. The fourth indication information is used to instruct the first UE to use an original key, or indicate that a key of the first UE does not change, or instruct the first UE to generate a new key by using a key KeNB of an evolved node B NodeB.

Preferably, the sending unit 301 is further configured to: before the receiving unit 302 receives the RRC connection reestablishment complete message sent by the first UE, send the RRC connection reestablishment message and first indication information to the first anchor node. The first indication information is used for the first anchor node to recognize, according to the first indication information, that the RRC connection reestablishment message is an RRC message that a signaling radio bearer SRB0 bears. The RRC message is processed by using an RRC layer entity of the first anchor node.

Preferably, the sending unit 301 is further configured to: before the receiving unit 302 receives the RRC connection reestablishment complete message sent by the first UE, send the RRC connection reestablishment message to the first anchor node. The RRC connection reestablishment message carries first indication information, or a control plane signaling message that bears the RRC connection reestablishment message carries first indication information. The first indication information is used for the first anchor node to recognize, according to the first indication information, that the RRC connection reestablishment message is an RRC message that a signaling radio bearer SRB0 bears. The RRC message is processed by using an RRC layer entity of the first anchor node.

Preferably, the sending unit 301 is further configured to: before the receiving unit 302 receives the RRC connection reestablishment complete message sent by the first UE, send a configuration parameter of the first UE to the first anchor node.

Preferably, the sending unit 301 is specifically configured to send second indication information to the first anchor node by adding the second indication information to the RRC connection reestablishment complete message or adding the second indication information to a control plane signaling message that bears the RRC connection reestablishment complete message. The second indication information is used for the first anchor node to recognize, according to the second indication information, that the RRC connection reestablishment complete message is an RRC message that a signaling radio bearer SRB1 bears.

Preferably, the sending unit 301 is further configured to send second indication information to the first anchor node. The second indication information is used for the first anchor node to recognize, according to the second indication information, that the RRC connection reestablishment complete message is an RRC message that a signaling radio bearer SRB1 bears.

Preferably, the apparatus further includes a packet data processing unit 308.

The packet data processing unit 308 is configured to process, by using a radio link control RLC layer entity, an RRC message that is sent by the first UE and that includes the RRC connection reestablishment complete message into a corresponding packet data convergence protocol protocol data unit PDCP PDU. The RRC message includes an RRC message that an SRB1 bears or an RRC message that an SRB2 bears, the RRC connection reestablishment complete message is an RRC message that an SRB1 bears, and the RRC message is used for a first PDCP layer entity in the first anchor node to process the RRC message that an SRB1 bears and send the processed RRC message to an RRC layer entity, or the RRC message is used for a second PDCP layer entity in the first anchor node to process the RRC message that an SRB2 bears and send the processed RRC message to the RRC layer entity.

Preferably, the receiving unit 302 is specifically configured to receive a packet data convergence protocol protocol data unit PDCP PDU corresponding to an RRC message sent by the first anchor node. The RRC message includes an RRC message that an SRB1 bears or an RRC message that an SRB2 bears, and the RRC message is used for a first radio link control RLC layer entity of the second serving node to process the RRC message that an SRB1 bears and send the processed RRC message to the first UE by using a Media Access Control MAC layer and a physical layer, or the RRC message is used for a second RLC layer entity of the second serving node to process the RRC message that an SRB2 bears and send the processed RRC message to the first UE by using a MAC layer and a physical layer.

Figure 4:
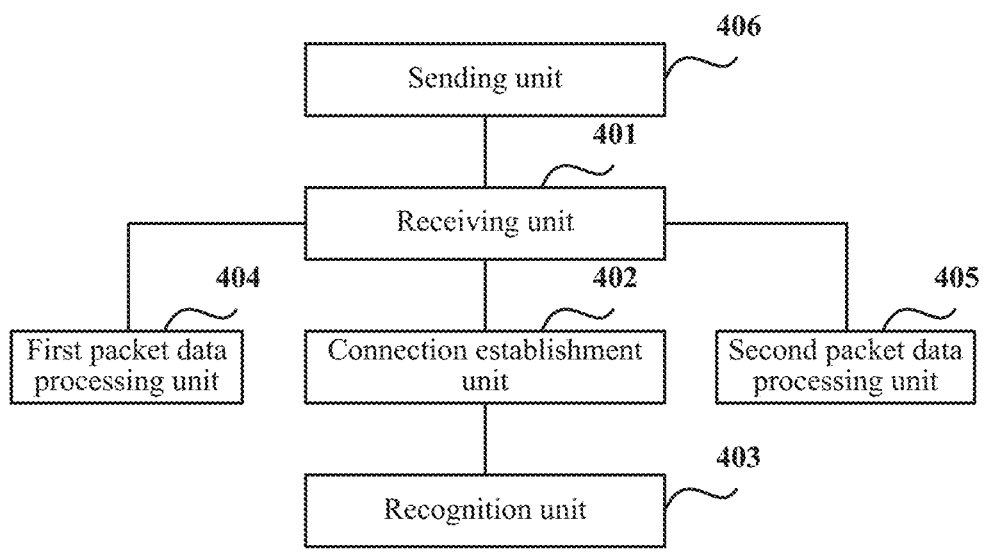
FIG. 4 is a schematic apparatus structural diagram of an RRC connection apparatus according to Embodiment 3 of the present invention.

FIG. 4 is a schematic apparatus structural diagram of an RRC connection apparatus according to Embodiment 3 of the present invention. The apparatus is disposed on an anchor node, and the apparatus includes a receiving unit 401 and a connection establishment unit 402.

The receiving unit 401 is configured to receive an RRC connection establishment complete message sent by the serving node.

The connection establishment unit 402 is configured to establish an RRC connection between the first anchor node and the first UE according to the RRC connection establishment complete message received by the receiving unit 401.

The RRC connection establishment complete message is the RRC connection establishment complete message generated by the first UE according to an RRC connection establishment message sent by the serving node, and the RRC connection establishment complete message is sent to the serving node.

Preferably, the receiving unit 401 is further configured to: before the serving node receives the RRC connection establishment complete message sent by the first UE, receive a configuration parameter and a UE identifier of the first UE that are sent by the serving node.

Preferably, the receiving unit 401 is specifically configured to receive the RRC connection establishment message sent by the serving node. The RRC connection establishment message includes the configuration parameter of the first UE.

The RRC connection establishment message carries first indication information, or a control plane signaling message that bears the RRC connection establishment message carries first indication information. The apparatus further includes a recognition unit 403.

The recognition unit 403 is configured to recognize, according to the first indication information, that the RRC connection establishment message is an RRC message that a signaling radio bearer SRB0 bears. The RRC message is processed by using an RRC layer entity of the first anchor node.

Preferably, the receiving unit 401 is specifically configured to receive the RRC connection establishment message sent by the serving node. The RRC connection establishment message includes the configuration parameter of the first UE.

The receiving unit 401 is further configured to receive first indication information sent by the serving node.

The apparatus further includes a recognition unit 403.

The recognition unit 403 is configured to recognize, according to the first indication information, that the RRC connection establishment message is an RRC message that a signaling radio bearer SRB0 bears. The RRC message is processed by using an RRC layer entity of the first anchor node.

Preferably, the receiving unit 401 is specifically configured to receive a control plane signaling message that is sent by the serving node and that bears the RRC connection establishment complete message. The RRC connection establishment complete message carries second indication information, or the control plane signaling message carries second indication information. The apparatus further includes a recognition unit 403.

The recognition unit 403 is configured to recognize, according to the second indication information, that the RRC connection establishment complete message is an RRC message that an SRB1 bears.

Preferably, the receiving unit 401 is further configured to receive second indication information sent by the serving node. The apparatus further includes a recognition unit 403.

The recognition unit 403 is configured to recognize, according to the second indication information, that the RRC connection establishment complete message is an RRC message that an SRB1 bears.

Preferably, the receiving unit 401 is specifically configured to receive a corresponding packet data convergence protocol protocol data unit PDCP PDU sent after a radio link control RLC layer entity of the serving node processes an RRC message that is sent by the first UE and that includes the RRC connection establishment complete message into the PDCP PDU. The RRC message includes an RRC message that an SRB1 bears or an RRC message that an SRB2 bears, and the RRC connection establishment complete message is an RRC message that an SRB1 bears. The apparatus further includes a first packet data processing unit 404 and a second packet data processing unit 405.

The first packet data processing unit 404 is configured to: process, by using a first PDCP layer entity, the RRC message that an SRB1 bears, and send the processed RRC message to an RRC layer entity.

The second packet data processing unit 405 is configured to: process, by using a second PDCP layer entity, the RRC message that an SRB2 bears, and send the processed RRC message to the RRC layer entity.

Preferably, the apparatus further includes a sending unit 406.

The sending unit 406 is configured to send a packet data convergence protocol protocol data unit PDCP PDU corresponding to an RRC message to the serving node. The RRC message includes an RRC message that an SRB1 bears or an RRC message that an SRB2 bears, and the RRC message is used for a first radio link control RLC layer entity of the serving node to process the RRC message that an SRB1 bears and send the processed RRC message to the first UE by using a Media Access Control MAC layer and a physical layer, or the RRC message is used for a second RLC layer entity of the serving node to process the RRC message that an SRB2 bears and send the processed RRC message to the first UE by using a MAC layer and a physical layer.

Figure 5:
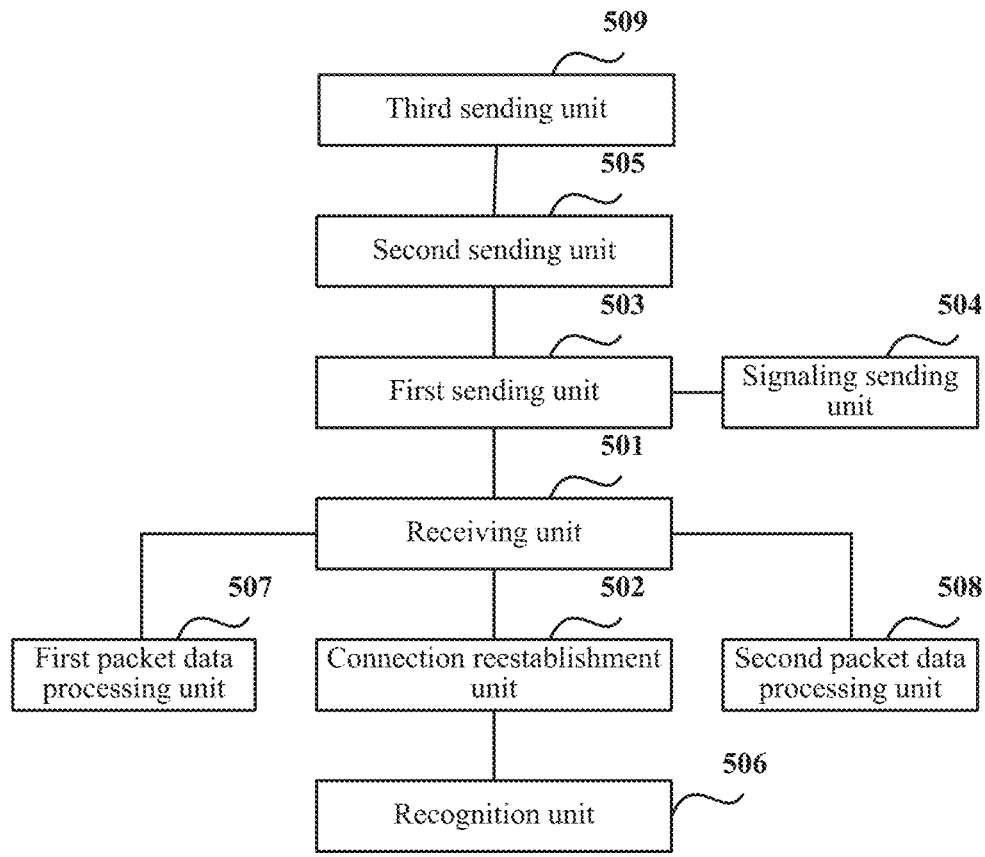
FIG. 5 is a schematic apparatus structural diagram of an RRC reconnection apparatus according to Embodiment 4 of the present invention.

FIG. 5 is a schematic apparatus structural diagram of an RRC reconnection apparatus according to Embodiment 4 of the present invention. The apparatus is disposed on an anchor node, and the apparatus includes a receiving unit 501 and a connection reestablishment unit 502.

The receiving unit 501 is configured to receive an RRC connection reestablishment complete message sent by a second serving node.

The connection reestablishment unit 502 is configured to reestablish an RRC connection between a first anchor node and first UE according to the RRC connection reestablishment complete message received by the receiving unit 501.

The RRC connection reestablishment complete message is the RRC connection reestablishment complete message generated by the first UE according to an RRC connection reestablishment message sent by the second serving node, and the RRC connection reestablishment complete message is sent to the second serving node.

Preferably, the apparatus further includes a first sending unit 503.

The first sending unit 503 is configured to: before the second serving node sends the RRC connection reestablishment message to the first UE, send a first user equipment identifier UEID and a next hop chaining count NCC of the first UE to which the first anchor node has established an RRC connection to the second serving node.

The receiving unit 501 is specifically configured to receive an RRC connection reestablishment request message sent by the first UE. The RRC connection reestablishment request message includes the first UEID.

That the second serving node generates the RRC connection reestablishment message according to the RRC connection reestablishment request message and sends the RRC connection reestablishment message to the first UE includes: obtaining, by the second serving node, the NCC according to the first UEID, generating the RRC connection reestablishment message including the NCC, and sending the RRC connection reestablishment message to the first UE, so that the first UE derives a new key according to the NCC.

Preferably, the first sending unit 503 is specifically configured to:

after the first anchor node has established an RRC connection to the first UE, send the first user equipment identifier UEID and the next hop chaining count NCC of the first UE to which the first anchor node has established an RRC connection to the second serving node; or after the first anchor node receives a request message sent by the second serving node, send the first UEID and the NCC of the first UE to which the first anchor node has established an RRC connection to the second serving node.

Preferably, the apparatus further includes a signaling sending unit 504.

The signaling sending unit 504 is configured to: after the first sending unit 503 sends the first user equipment identifier UEID and the next hop chaining count NCC of the first UE to which the first anchor node has established an RRC connection to the second serving node, and after the RRC connection of the first UE is disconnected from the first anchor node, send signaling to the second serving node. The signaling is used for the second serving node to release the NCC of the first UE according to the signaling.

Preferably, the apparatus further includes a second sending unit 505.

The second sending unit 505 is configured to: before the second serving node sends the RRC connection reestablishment message to the first UE, send an identifier of a neighboring cell served by the first anchor node to the second serving node.

The RRC connection reestablishment request message includes an identifier of a source cell, so that the second serving node recognizes that the source cell is the neighboring cell served by the first anchor node or the source cell is a current cell, and sends fourth indication information to the first UE, to instruct the first UE to use an original key, or indicate that a key of the first UE does not change, or instruct the first UE to generate a new key by using a key KeNB of an evolved node B NodeB.

Preferably, the receiving unit 501 is further configured to: before the second serving node receives the RRC connection reestablishment complete message sent by the first UE, receive the RRC connection reestablishment message and first indication information sent by the second serving node. The apparatus further includes a recognition unit 506.

The recognition unit 506 is configured to recognize, according to the first indication information, that the RRC connection reestablishment message is an RRC message that a signaling radio bearer SRB0 bears. The RRC message is processed by using an RRC layer entity of the first anchor node.

Preferably, the receiving unit 501 is further configured to: before the second serving node receives the RRC connection reestablishment complete message sent by the first UE, receive the RRC connection reestablishment message sent by the second serving node. The RRC connection reestablishment message carries first indication information, or a control plane signaling message that bears the RRC connection reestablishment message carries first indication information. The apparatus further includes a recognition unit 506.

The recognition unit 506 is configured to: recognize, according to the first indication information, that the RRC connection reestablishment message is an RRC message that a signaling radio bearer SRB0 bears. The RRC message is processed by using an RRC layer entity of the first anchor node.

Preferably, the receiving unit 501 is further configured to: before the second serving node receives the RRC connection reestablishment complete message sent by the first UE, receive a configuration parameter that is of the first UE and that is sent by the second serving node.

Preferably, the receiving unit 501 is specifically configured to receive the RRC connection reestablishment complete message sent by the second serving node. The RRC connection reestablishment complete message carries second indication information, or a control plane signaling message that bears the RRC connection reestablishment complete message carries second indication information. The apparatus further includes a recognition unit 506.

The recognition unit 506 is configured to recognize, according to the second indication information, that the RRC connection reestablishment complete message is an RRC message that a signaling radio bearer SRB1 bears.

Preferably, the receiving unit 501 is further configured to receive second indication information sent by the second serving node. The apparatus further includes a recognition unit 506.

The recognition unit 506 is configured to recognize, according to the second indication information, that the RRC connection reestablishment complete message is an RRC message that a signaling radio bearer SRB1 bears.

Preferably, the receiving unit 501 is specifically configured to receive a corresponding packet data convergence protocol protocol data unit PDCP PDU sent to the first anchor node after a radio link control RLC layer entity of the second serving node processes an RRC message that is sent by the first UE and that includes the RRC connection reestablishment complete message into the PDCP PDU. The RRC message includes an RRC message that an SRB1 bears or an RRC message that an SRB2 bears, and the RRC connection reestablishment complete message is an RRC message that an SRB1 bears. The apparatus further includes a first packet data processing unit 507 and a second packet data processing unit 508.

The first packet data processing unit 507 is configured to: process the RRC message that an SRB1 bears by using a first PDCP layer entity in the first anchor node, and send the processed RRC message to an RRC layer entity.

The second packet data processing unit 508 is configured to: process the RRC message that an SRB2 bears by using a second PDCP layer entity in the first anchor node, and send the processed RRC message to the RRC layer entity.

Preferably, the apparatus further includes a third sending unit 509.

The third sending unit 509 is configured to send a packet data convergence protocol protocol data unit PDCP PDU corresponding to an RRC message to the second serving node. The RRC message includes an RRC message that an SRB1 bears or an RRC message that an SRB2 bears, and the RRC message is used for a first radio link control RLC layer entity of the second serving node to process the RRC message that an SRB1 bears and send the processed RRC message to the first UE by using a Media Access Control MAC layer and a physical layer, or the RRC message is used for a second RLC layer entity of the second serving node to process the RRC message that an SRB2 bears and send the processed RRC message to the first UE by using a MAC layer and a physical layer.

Figure 6:
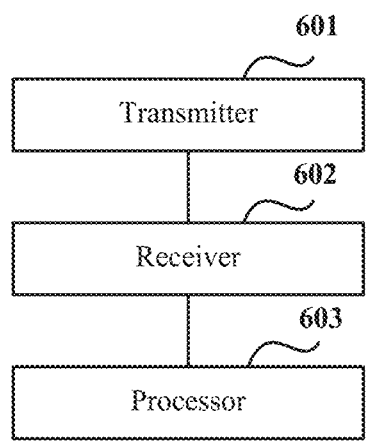
FIG. 6 is a schematic structural diagram of a serving node according to Embodiment 5 of the present invention.

FIG. 6 is a schematic structural diagram of a serving node according to Embodiment 5 of the present invention. The serving node includes:
a transmitter 601;
a receiver 602; and
a processor 603.

The transmitter 601 is configured to broadcast a system message.

The receiver 602 is configured to receive a random access message sent by first user equipment UE according to the system message.

The transmitter 601 is further configured to send a random access response message to the first UE.

The receiver 602 is further configured to receive an RRC connection request message sent by the first UE.

The processor 603 is configured to generate an RRC connection establishment message according to the RRC connection request message received by the receiver 602.

The transmitter 601 is further configured to send the RRC connection establishment message generated by the processor 603 to the first UE.

The receiver 602 is further configured to receive an RRC connection establishment complete message sent by the first UE.

The transmitter 601 is further configured to send the RRC connection establishment complete message to a first anchor node, to enable the first anchor node to establish an RRC connection to the first UE.

Figure 7:
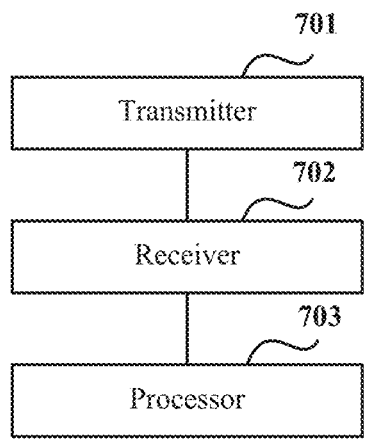
FIG. 7 is a schematic structural diagram of a serving node according to Embodiment 6 of the present invention.

FIG. 7 is a schematic structural diagram of a serving node according to Embodiment 6 of the present invention. The serving node includes:
a transmitter 701;
a receiver 702; and
a processor 703.

The transmitter 701 is configured to broadcast a system message.

The receiver 702 is configured to receive a random access message sent by first user equipment UE according to the system message.

The transmitter 701 is further configured to send a random access response message to the first UE.

The receiver 702 is further configured to receive an RRC connection reestablishment request message sent by the first UE.

The processor 703 is configured to generate an RRC connection reestablishment message according to the RRC connection reestablishment request message received by the receiver 702.

The transmitter 701 is further configured to send the RRC connection reestablishment message generated by the processor 703 to the first UE.

The receiver 702 is further configured to receive an RRC connection reestablishment complete message sent by the first UE.

The transmitter 701 is further configured to send the RRC connection reestablishment complete message to a first anchor node, to enable the first anchor node to reestablish an RRC connection to the first UE.

Figure 8:
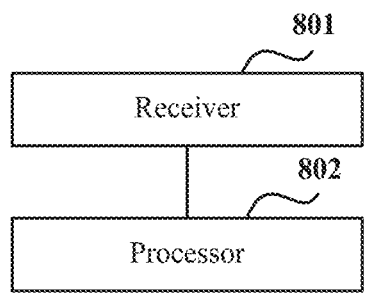
FIG. 8 is a schematic structural diagram of an anchor node according to Embodiment 7 of the present invention.

FIG. 8 is a schematic structural diagram of an anchor node according to Embodiment 7 of the present invention. The anchor node includes:

a receiver 801; and a processor 802.

The receiver 801 is configured to receive an RRC connection establishment complete message sent by the serving node.

The processor 802 is configured to establish an RRC connection between the anchor node and first UE according to the RRC connection establishment complete message received by the receiver 801.

The RRC connection establishment complete message is the RRC connection establishment complete message generated by the first UE according to an RRC connection establishment message sent by the serving node, and the RRC connection establishment complete message is sent to the serving node.

Figure 9:
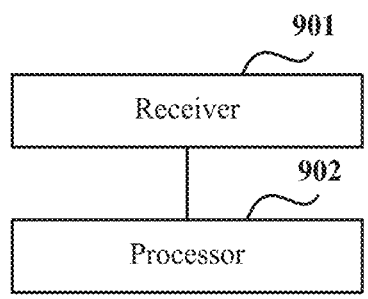
FIG. 9 is a schematic structural diagram of an anchor node according to Embodiment 8 of the present invention.

FIG. 9 is a schematic structural diagram of an anchor node according to Embodiment 8 of the present invention. The anchor node includes:

a receiver 901; and a processor 902.

The receiver 901 is configured to receive an RRC connection reestablishment complete message sent by the second serving node.

The processor 902 is configured to reestablish an RRC connection between the anchor node and first UE according to the RRC connection reestablishment complete message received by the receiver 901.

The RRC connection reestablishment complete message is the RRC connection reestablishment complete message generated by the first UE according to an RRC connection reestablishment message sent by the second serving node, and the RRC connection reestablishment complete message is sent to the second serving node.

Figure 10:
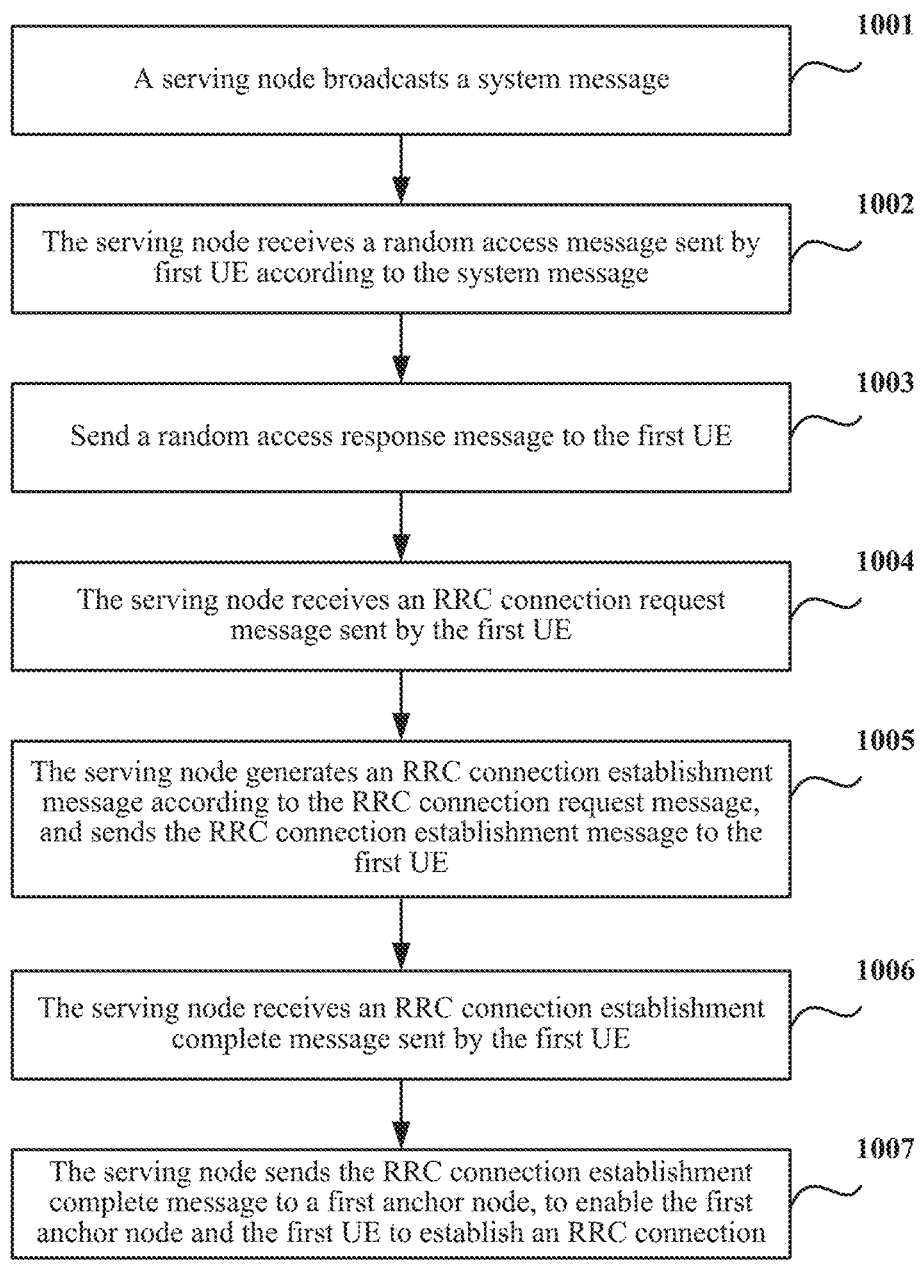
FIG. 10 is a flowchart of an RRC connection method on a side of a serving node according to Embodiment 9 of the present invention.

FIG. 10 is a flowchart of an RRC connection method on a side of a serving node according to Embodiment 9 of the present invention. The RRC connection method is based on the network architecture shown in FIG. 1. The method is performed by the serving node. As shown in FIG. 10, the method specifically includes the following steps.

Step 1001: The serving node broadcasts a system message.

The system message is specifically a system message of an RRC layer. The serving node may broadcast the system message to all UEs that are in a coverage range of the serving node and that have established a wireless connection to the serving node, or may select, according to a predetermined policy, multiple UEs from the UEs that have established a wireless connection to the serving node and broadcast the system message to the selected multiple UEs.

Step 1002: The serving node receives a random access message sent by first UE according to the system message.

In this embodiment of the present invention, the system message may carry an access parameter. The first UE may send the random access message to the serving node according to the access parameter carried in the received system message.

Step 1003: Send a random access response message to the first UE.

The serving node may send the random access response message to the first UE after receiving the random access message sent by the first UE.

The random access response message may include a cell radio network temporary identifier (CRNTI) allocated to the first UE.

Step 1004: The serving node receives an RRC connection request message sent by the first UE.

The RRC connection request message is an RRC message that an SRB0 bears. In this embodiment of the present invention, the serving node has a function of processing an RRC message that an SRB0 bears. After receiving the RRC connection request message, the serving node directly delivers the RRC connection request message to an RRC layer entity for processing.

Step 1005: The serving node generates an RRC connection establishment message according to the RRC connection request message, and sends the RRC connection establishment message to the first UE.

In this embodiment of the present invention, the generating, by the serving node, an RRC connection establishment message according to the RRC connection request message may specifically include: selecting, by the serving node, the first UE from at least one UE including the first UE according to a received RRC connection request message sent by the at least one UE, and generating the RRC connection establishment message of the first UE according to the RRC connection request message of the first UE.

In addition, a subsequent configuration parameter of the UE needs to be delivered by using an SRB1, and the SRB1 is on an anchor node. Therefore, the anchor node needs to know the configuration parameter of the UE. The method may further include: sending the configuration parameter of the first UE and a UE identifier of the first UE to the first anchor node, so that the first anchor node knows the configuration parameter of the first UE. Moreover, the first anchor node may further recognize, according to the configuration parameter of the first UE, that the first UE is UE that is newly connected, and create a UE context for the first UE. The UE context may specifically include radio bearer configuration information. The UE identifier may be specifically a cell radio network temporary identifier CRNTI allocated by the serving node to the UE. The serving node may deliver the CRNTI to the UE by using the random access response message.

In this embodiment of the present invention, the serving node may send the RRC connection establishment message to the first anchor node. The RRC connection establishment message carries the configuration parameter of the first UE, so that the first anchor node may obtain the configuration parameter of the first UE. Alternatively, instead of sending the RRC connection establishment message to the first anchor node, the serving node may send the configuration parameter of the first UE to the first anchor node by using a dedicated message. Alternatively, first the configuration parameter of the first UE is not sent to the first anchor node, and the configuration parameter is sent only when it is determined that the first anchor node needs the configuration parameter of the first UE, for example, when the first anchor node needs to generate the RRC message for the first UE or needs to obtain an L1/L2 configuration of the first UE.

The RRC connection establishment message may carry first indication information, or a control plane signaling message that bears the RRC connection establishment message carries first indication information. The first indication information is used for the first anchor node to recognize, according to the first indication information, that the RRC connection establishment message is an RRC message that a signaling radio bearer SRB0 bears. The RRC message is processed by using an RRC layer entity of the first anchor node.

The configuration parameter of the first UE may include a MAC layer configuration parameter and a physical layer configuration parameter, for example, an SRB-ToAddModList (OK?) parameter, a mac-MainConfig (OK) parameter, a PhysicalConfigDedicated (OK) parameter, an RLF-TimersAndConstants-r9 (OK) parameter, a MeasSubframePatternPCell-r10 (OK) parameter, and a NeighCellsCRS-Info-r11 (OK) parameter. Because the serving node has an RLC layer, a MAC layer, and a physical layer, configuration of the MAC layer and configuration of the physical layer of the UE may be implemented. The configuration parameter of the first UE may further include an srb-Identity parameter, an rlc-Config parameter, and a logicalChannelConfig parameter.

In this embodiment of the present invention, the first indication information and the RRC connection establishment message may be sent to the first anchor node together, or the first indication information and the RRC connection establishment message may be separately sent. Therefore, the following steps may be further included. The serving node sends the first indication information to the first anchor node. The first indication information is used for the first anchor node to recognize, according to the first indication information, that the RRC connection establishment message is an RRC message that an SRB0 bears, and the RRC layer entity of the first anchor node processes the RRC connection establishment message. The first indication information may be an explicit signaling indication or a specific message name. The specific message name is, for example, SRB0RRCTransfer, and InitialRRCTransfer.

Step 1006: The serving node receives an RRC connection establishment complete message sent by the first UE.

The RRC connection establishment complete message is an RRC message that an SRB1 bears. After the serving node receives the RRC connection establishment complete message sent by the first UE, a first RLC layer entity of the serving node processes the RRC connection establishment complete message and forwards the processed RRC connection establishment complete message. The RRC layer entity of the serving node does not perform processing.

In this embodiment of the present invention, the RRC connection establishment complete message may include the CRNTI, so that the first anchor node determines, according to the CRNTI, whether a radio link failure RLF occurs in the first UE.

Step 1007: The serving node sends the RRC connection establishment complete message to the first anchor node, to enable the first anchor node and the first UE to establish an RRC connection.

In this embodiment of the present invention, the sending, by the serving node, the RRC connection establishment complete message to the first anchor node may include: adding, by the serving node, second indication information to the RRC connection establishment complete message, or adding second indication information to a control plane signaling message that bears the RRC connection establishment complete message and sending the control plane signaling message to the first anchor node. The second indication information is used for the first anchor node to recognize, according to the second indication information, that the RRC connection establishment complete message is an RRC message that an SRB1 bears. The second indication information may be specifically an explicit signaling indication or a preset message name.

The serving node may further separately send the second indication information to the first anchor node. The second indication information is used for the first anchor node to recognize, according to the second indication information, that the RRC connection establishment complete message is an RRC message that a signaling radio bearer SRB1 bears.

In addition, the method may further include: processing, by the RLC layer entity of the serving node, an RRC message that is sent by the first UE and that includes the RRC connection establishment complete message into a corresponding PDCP PDU and sending the PDCP PDU to the first anchor node. The RRC message includes an RRC message that an SRB1 bears or an RRC message that an SRB2 bears, and the RRC connection establishment complete message is an RRC message that an SRB1 bears. The RRC message is used for a first PDCP layer entity in the first anchor node to process the RRC message that an SRB1 bears and send the processed RRC message to the RRC layer entity, or the RRC message is used for a second PDCP layer entity in the first anchor node to process the RRC message that an SRB2 bears and send the processed RRC message to the RRC layer entity.

The method may further include: receiving, by the serving node, a PDCP PDU corresponding to an RRC message sent by the first anchor node. The RRC message includes an RRC message that an SRB1 bears or an RRC message that an SRB2 bears. The RRC message is used for the first RLC layer entity of the serving node to process the RRC message that an SRB1 bears and send the processed RRC message to the first UE by using a MAC layer and a physical layer, or the RRC message is used for a second RLC layer entity of the serving node to process the RRC message that an SRB2 bears and send the processed RRC message to the first UE by using a MAC layer and a physical layer.

As may be seen from the foregoing processing process, in Embodiment 9 the present invention, signaling load of a core network can be effectively reduced. Moreover, during establishment of an RRC connection between first UE and a first anchor node, a serving node processes an RRC connection request message and generates an RRC connection establishment message. Therefore, compared with generation of an RRC connection establishment message by an anchor node, a delay can be effectively reduced.

Figure 11A:
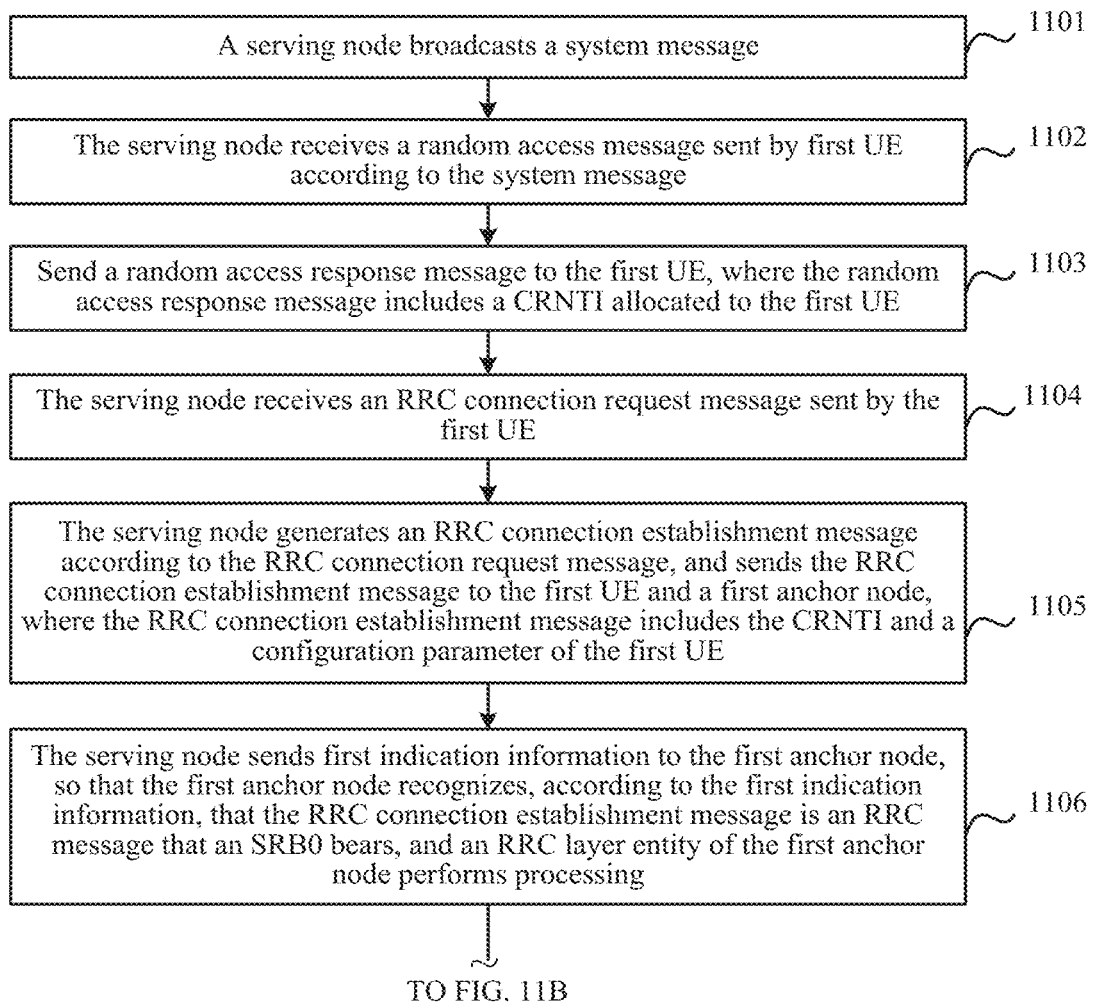
FIG. 11A and FIG. 11B are a flowchart of an RRC connection method on a side of a serving node according to Embodiment 10 of the present invention.
Figure 11B:
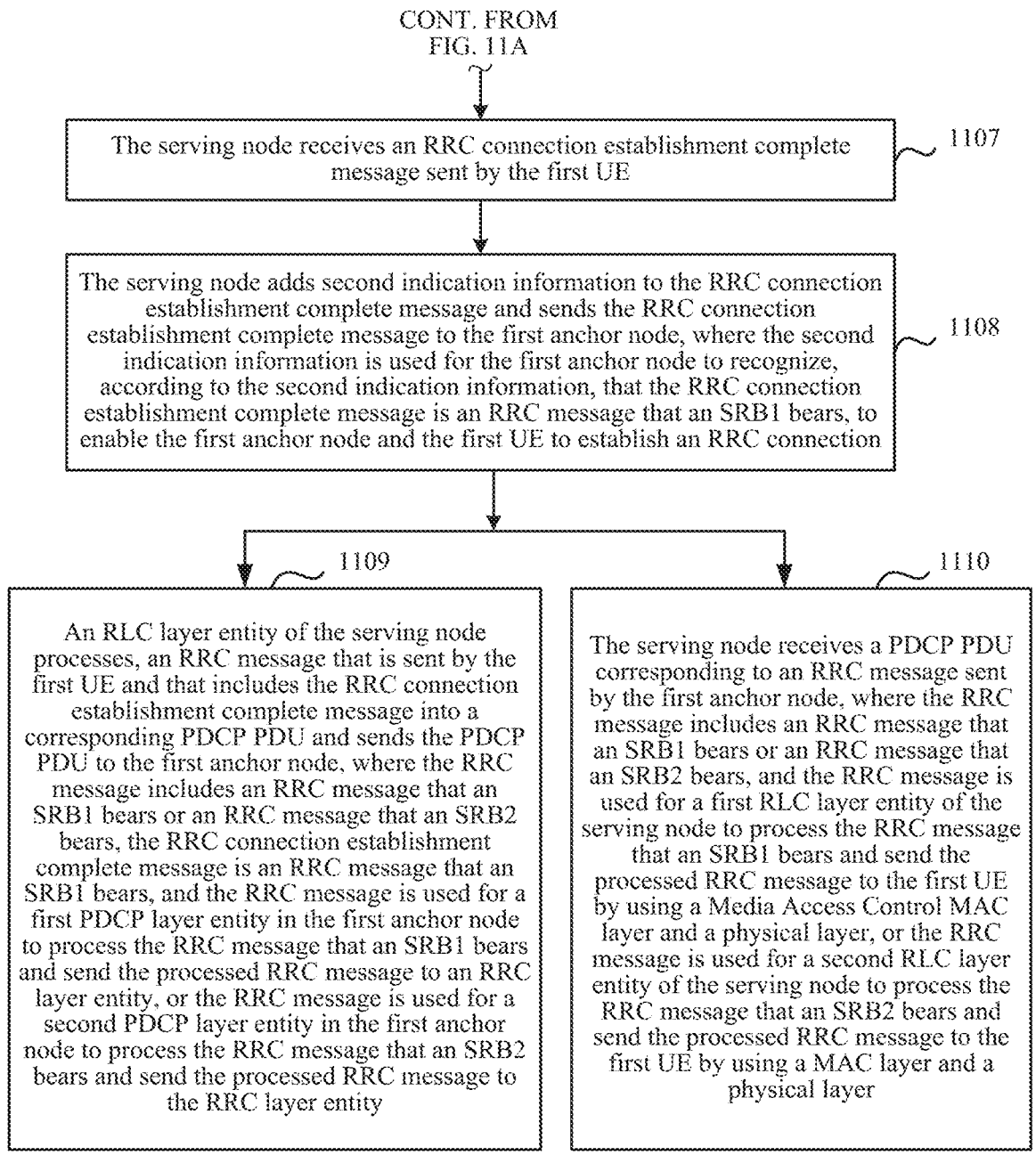

FIG. 11A and FIG. 11B are a flowchart of an RRC connection method on a side of a serving node according to Embodiment 10 of the present invention. The RRC connection method is based on the network architecture shown in FIG. 1. The method is performed by the serving node. When an RRC message is sent between the serving node and an anchor node, indication information used to indicate an SRB type further needs to be sent. As shown in FIG. 11A and FIG. 11B, the method specifically includes the following steps.

Step 1101: The serving node broadcasts a system message.

The system message is specifically a system message of an RRC layer. The serving node may broadcast the system message to all UEs that are in a coverage range of the serving node and that have established a wireless connection to the serving node, or may select, according to a predetermined policy, multiple UEs from the UEs that have established a wireless connection to the serving node and broadcast the system message to the selected multiple UEs.

Step 1102: The serving node receives a random access message sent by first UE according to the system message.

In this embodiment of the present invention, the system message may carry an access parameter. The first UE may send the random access message to the serving node according to the access parameter carried in the received system message.

Step 1103: Send a random access response message to the first UE, where the random access response message includes a CRNTI allocated to the first UE.

Step 1104: The serving node receives an RRC connection request message sent by the first UE.

The RRC connection request message is an RRC message that an SRB0 bears. In this embodiment of the present invention, the serving node has a function of processing an RRC message that an SRB0 bears. After receiving the RRC connection request message, the serving node delivers the RRC connection request message to an RRC layer entity for processing.

Step 1105: The serving node generates an RRC connection establishment message according to the RRC connection request message, and sends the RRC connection establishment message to the first UE and a first anchor node, where the RRC connection establishment message includes the CRNTI and a configuration parameter of the first UE.

The RRC connection establishment message includes the CRNTI, so that the first anchor node determines, according to the CRNTI, whether a radio link failure RLF occurs in the first UE.

In this embodiment of the present invention, the generating, by the serving node, an RRC connection establishment message according to the RRC connection request message includes: selecting, by the serving node, the first UE from at least one UE including the first UE according to a received RRC connection request message sent by the at least one UE, and generating the RRC connection establishment message of the first UE according to the RRC connection request message of the first UE.

The RRC connection establishment message includes the configuration parameter of the first UE, so that the first anchor node recognizes, according to the configuration parameter of the first UE, that the first UE is UE that is newly connected, and creates a UE context for the first UE.

The configuration parameter of the first UE may include a MAC layer configuration parameter and a physical layer configuration parameter, for example, an SRB-ToAddModList (OK?) parameter, a mac-MainConfig (OK) parameter, a PhysicalConfigDedicated (OK) parameter, an RLF-TimersAndConstants-r9 (OK) parameter, a MeasSubframePatternPCell-r10 (OK) parameter, and a NeighCellsCRS-Info-r11 (OK) parameter. Because the serving node has an RLC layer, a MAC layer, and a physical layer, configuration of the MAC layer and configuration of the physical layer of the UE may be implemented. The configuration parameter of the first UE may further include an srb-Identity parameter, an rlc-Config parameter, and a logicalChannelConfig parameter.

As may be seen from above, the serving node processes the RRC connection request message and generates an RRC connection establishment message. Therefore, compared with generation of an RRC connection establishment message by the anchor node, a delay can be effectively reduced.

Step 1106: The serving node sends the first indication information to the first anchor node, so that the first anchor node recognizes, according to the first indication information, that the RRC connection establishment message is an RRC message that an SRB0 bears, and the RRC layer entity of the first anchor node performs processing.

In this embodiment of the present invention, the first indication information and the RRC connection establishment message may be sent to the first anchor node together, or the first indication information and the RRC connection establishment message may be separately sent. The first indication information may be an explicit signaling indication or a preset message name. The preset message name is, for example, SRB0RRCTransfer, and InitialRRCTransfer.

Step 1107: The serving node receives an RRC connection establishment complete message sent by the first UE.

Step 1108: The serving node adds second indication information to the RRC connection establishment complete message and sends the RRC connection establishment complete message to the first anchor node, where the second indication information is used for the first anchor node to recognize, according to the second indication information, that the RRC connection establishment complete message is an RRC message that an SRB1 bears, to enable the first anchor node and the first UE to establish an RRC connection.

The second indication information may further be added to a control plane signaling message that bears the RRC connection establishment complete message and the control plane signaling message is sent to the first anchor node, or the second indication information is separately sent. The second indication information may be specifically an explicit signaling indication or a specific message name.

Step 1109: An RLC layer entity of the serving node processes, an RRC message that is sent by the first UE and that includes the RRC connection establishment complete message into a corresponding PDCP PDU and sends the PDCP PDU to the first anchor node, where the RRC message includes an RRC message that an SRB1 bears or an RRC message that an SRB2 bears, the RRC connection establishment complete message is an RRC message that an SRB1 bears, and the RRC message is used for a first PDCP layer entity in the first anchor node to process the RRC message that an SRB1 bears and send the processed RRC message to an RRC layer entity, or the RRC message is used for a second PDCP layer entity in the first anchor node to process the RRC message that an SRB2 bears and send the processed RRC message to the RRC layer entity.

Step 1110: The serving node receives a PDCP PDU corresponding to an RRC message sent by the first anchor node, where the RRC message includes an RRC message that an SRB1 bears or an RRC message that an SRB2 bears, and the RRC message is used for a first RLC layer entity of the serving node to process the RRC message that an SRB1 bears and send the processed RRC message to the first UE by using a Media Access Control MAC layer and a physical layer, or the RRC message is used for a second RLC layer entity of the serving node to process the RRC message that an SRB2 bears and send the processed RRC message to the first UE by using a MAC layer and a physical layer.

As may be seen from the foregoing processing process, in this embodiment of the present invention, for an RRC message sent between a serving node and an anchor node, indication information used to indicate an SRB type further needs to be sent, so that the serving node and the anchor node perform corresponding processing according to the SRB type, thereby implementing separation of RRC functions on the serving node and the anchor node.

Figure 12:
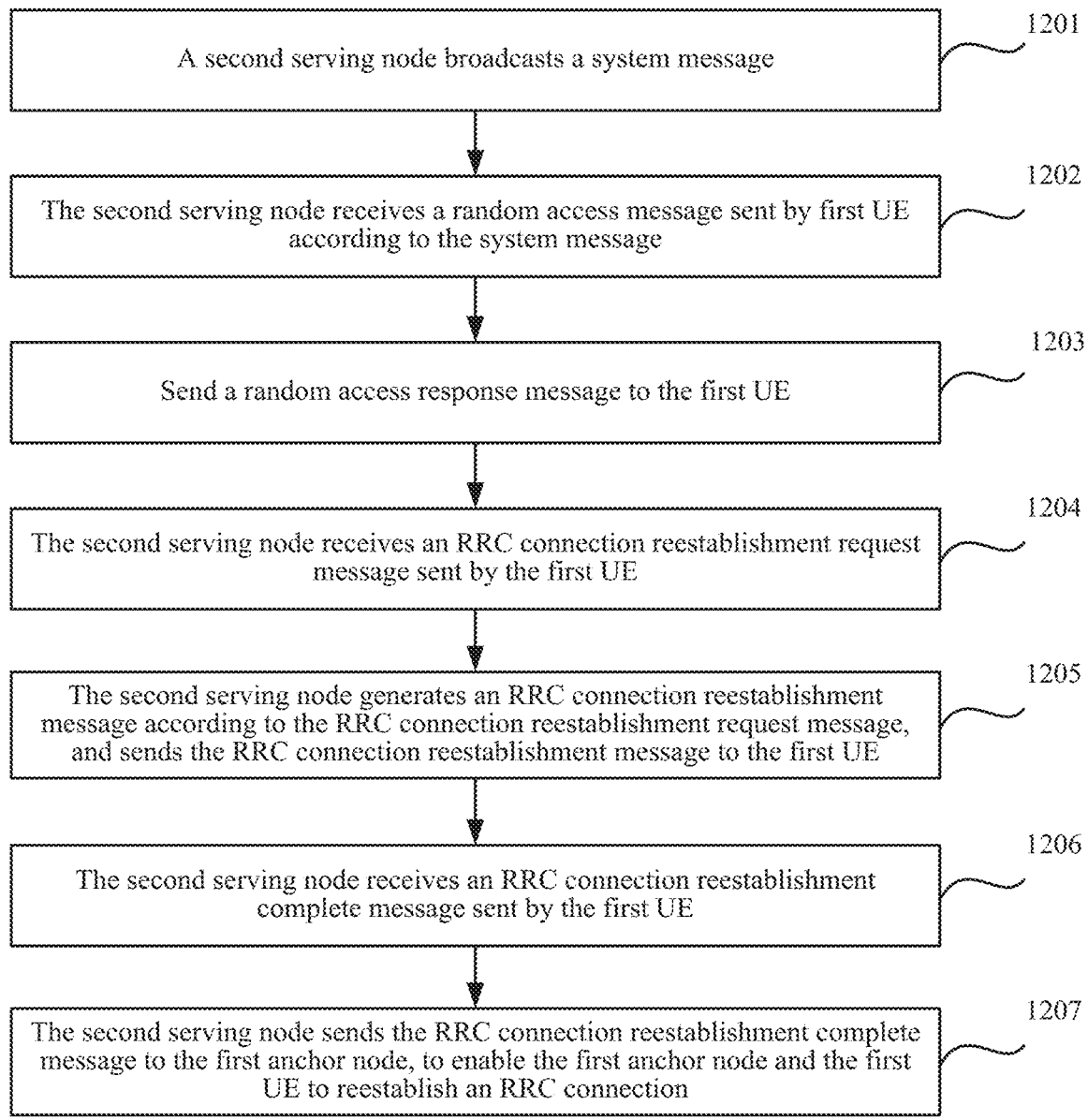
FIG. 12 is a flowchart of an RRC reconnection method on a side of a serving node according to Embodiment 11 of the present invention.

FIG. 12 is a flowchart of an RRC reconnection method on a side of a serving node according to Embodiment 11 of the present invention. The RRC reconnection method is based on the network architecture shown in FIG. 1. The method is performed by the serving node. As shown in FIG. 12, the method specifically includes the following steps.

Step 1201: A second serving node broadcasts a system message.

The system message is specifically a system message of an RRC layer.

In this embodiment of the present invention, first UE may first establish a connection to a first serving node, and then establish a connection to the second serving node, that is, switch a serving node. Alternatively, after establishing a connection to the second serving node for the first time, the first UE may establish a connection to the second serving node again.

Step 1202: The second serving node receives a random access message sent by the first UE according to the system message.

Step 1203: Send a random access response message to the first UE.

Step 1204: The second serving node receives an RRC connection reestablishment request message sent by the first UE.

The RRC connection reestablishment request message may be specifically an RRC connection reestablishment request message sent to the second serving node after an RLF occurs in the first UE.

Step 1205: The second serving node generates an RRC connection reestablishment message according to the RRC connection reestablishment request message, and sends the RRC connection reestablishment message to the first UE.

In this embodiment of the present invention, the second serving node may further send the RRC connection reestablishment message to a first anchor node. The RRC connection reestablishment message carries first indication information, or a control plane signaling message that bears the RRC connection reestablishment message carries first indication information. The first indication information is used for the first anchor node to recognize, according to the first indication information, that the RRC connection reestablishment message is an RRC message that an SRB0 bears. The RRC message is processed by using an RRC layer entity of the first anchor node.

The serving node may also send the first indication information separately to the first anchor node.

The method may further include: sending a configuration parameter of the first UE to the first anchor node, so that the first anchor node knows the configuration parameter of the first UE. The configuration parameter includes at least a MAC layer configuration and a UE physical layer configuration.

In this embodiment of the present invention, the first anchor node may recognize, according to the configuration parameter of the first UE, that the first UE is UE that is newly connected, and create a UE context for the first UE.

Step 1206: The second serving node receives an RRC connection reestablishment complete message sent by the first UE.

Step 1207: The second serving node sends the RRC connection reestablishment complete message to the first anchor node, to enable the first anchor node and the first UE to reestablish an RRC connection.

The sending, by the second serving node, the RRC connection reestablishment complete message to a first anchor node may specifically include: sending, by the second serving node, second indication information to the first anchor node by adding the second indication information to the RRC connection reestablishment complete message or adding the second indication information to a control plane signaling message that bears the RRC connection reestablishment complete message. The second indication information is used for the first anchor node to recognize, according to the second indication information, that the RRC connection reestablishment complete message is an RRC message that an SRB1 bears.

The serving node may also send the second indication information to the first anchor node separately.

After the RRC connection is reestablished, the method may further include: processing, by an RLC layer entity of the second serving node, an RRC message that is sent by the first UE and that includes the RRC connection reestablishment complete message into a corresponding PDCP PDU. The RRC message includes an RRC message that an SRB1 bears or an RRC message that an SRB2 bears. The RRC connection reestablishment complete message is an RRC message that an SRB1 bears. The RRC message is used for a first PDCP layer entity in the first anchor node to process the RRC message that an SRB1 bears and send the processed RRC message to an RRC layer entity, or the RRC message is used for a second PDCP layer entity in the first anchor node to process the RRC message that an SRB2 bears and send the processed RRC message to the RRC layer entity.

After the RRC connection is reestablished, the method may further include: receiving, by the second serving node, a PDCP PDU corresponding to an RRC message sent by the first anchor node. The RRC message includes an RRC message that an SRB1 bears or an RRC message that an SRB2 bears. The RRC message is used for a first RLC layer entity of the second serving node to process the RRC message that an SRB1 bears and send the processed RRC message to the first UE by using a MAC layer and a physical layer, or the RRC message is used for a second RLC layer entity of the second serving node to process the RRC message that an SRB2 bears and send the processed RRC message to the first UE by using a MAC layer and a physical layer.

As may be seen from the foregoing processing process, by means of the RRC reconnection method provided in this embodiment of the present invention, signaling load of a core network can be effectively reduced.

Figure 13:
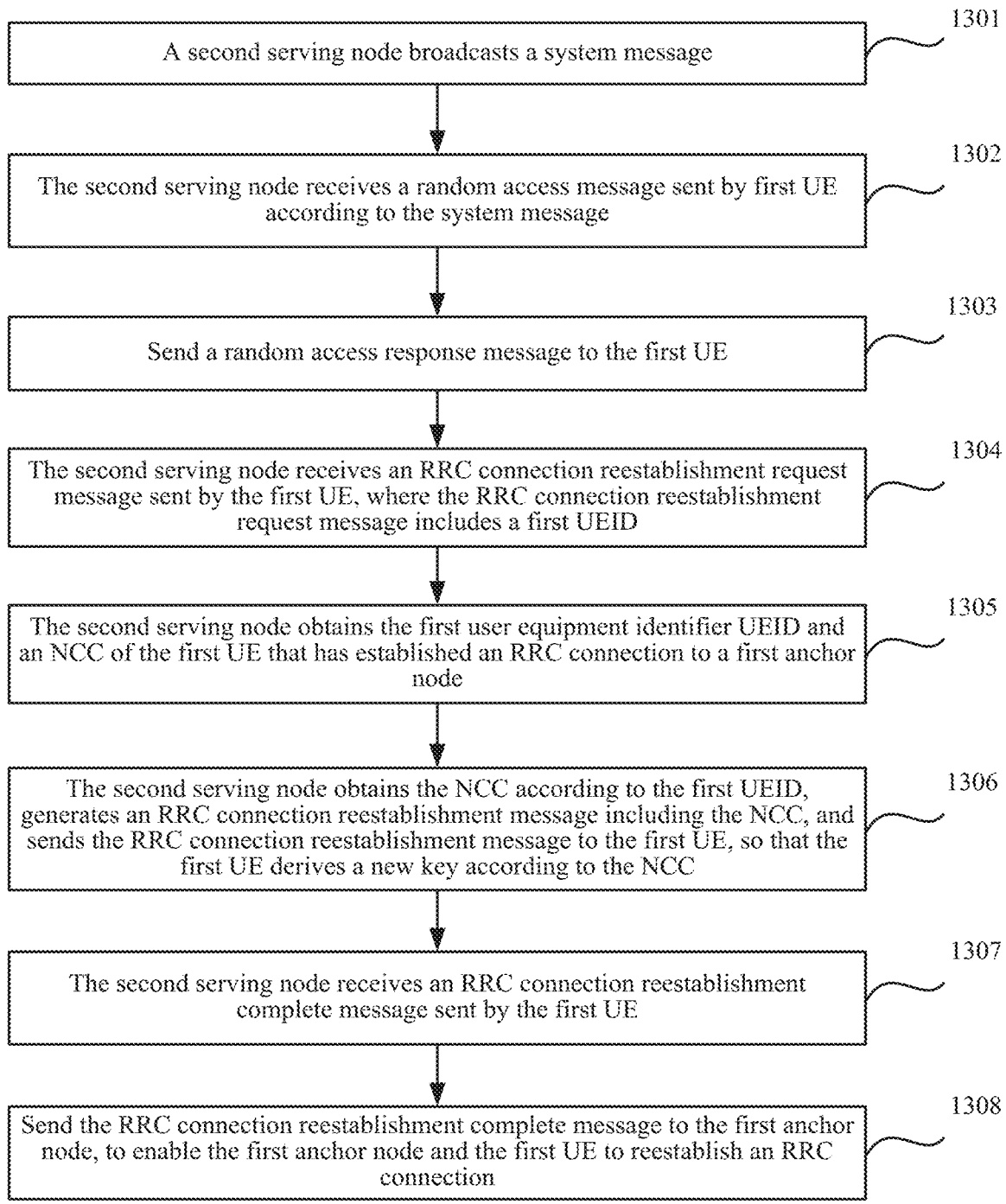
FIG. 13 is a flowchart of RRC reconnection method on a side of a serving node according to Embodiment 12 of the present invention.

FIG. 13 is a flowchart of an RRC reconnection method on a side of a serving node according to Embodiment 12 of the present invention. The RRC connection method is based on the network architecture shown in FIG. 1. The method is performed by the serving node. A second serving node instructs, according to an auxiliary parameter delivered by an anchor node, UE to generate a key according to the auxiliary parameter. As shown in FIG. 13, the method specifically includes the following steps.

Step 1301: The second serving node broadcasts a system message.

Step 1302: The second serving node receives a random access message sent by first UE according to the system message.

Step 1303: Send a random access response message to the first UE.

Step 1304: The second serving node receives an RRC connection reestablishment request message sent by the first UE, where the RRC connection reestablishment request message includes a first UEID.

Step 1305: The second serving node obtains the first user equipment identifier UEID and an NCC of the first UE that has established an RRC connection to a first anchor node.

In this embodiment of the present invention, the first anchor node may send UEIDs and NCCs of all UEs that have established an RRC connection to the first anchor node to the second serving node. Alternatively, the first anchor node selects, from all the UEs that have established an RRC connection to the first anchor node, some UEs, for example, some UEs located at an edge of a cell or some UEs of which serving cell measurement results are less than a predefined threshold, and send UEIDs and NCCs of the selected UEs to the second serving node.

The first anchor node may send the UEIDs and the NCCs of all the UEs that have established an RRC connection to the first anchor node to the second serving node. Specifically, a cell to which UE establishes an RRC reconnection may be an original serving cell, or may be a neighboring cell of the serving cell. Therefore, the first anchor node may send the UEIDs and the NCCs of all the UEs that have established an RRC connection to the first anchor node to a base station of the neighboring cell and a base station of the original serving cell.

The second serving node may obtain, in the following two manners, the first user equipment identifier UEID and the next hop chaining count NCC of the first UE that has established an RRC connection to the first anchor node. In the first manner, after the first anchor node has established an RRC connection to the first UE, the second serving node obtains the first UEID and the NCC of the first UE that has established an RRC connection to the first anchor node. In the second manner, after sending a request message to the first anchor node, the second serving node receives the first UEID and the NCC of the first UE that is sent by the first anchor node and that has established an RRC connection.

In the second manner, the request message may be specifically sent to the first anchor node when the second serving node receives the connection reestablishment request message of the first UE.

The method may further include: after the RRC connection of the first UE is disconnected from the first anchor node, receiving, by the second serving node, signaling sent by the first anchor node, so that the second serving node releases the NCC of the first UE according to the signaling.

Disconnection of the RRC connection of the first UE from the first anchor node may include multiple cases, for example, a case in which the RRC connection is switched or a case in which the first UE turns to an idle state.

Step 1306: The second serving node obtains the NCC according to the first UEID, generates an RRC connection reestablishment message including the NCC, and sends the RRC connection reestablishment message to the first UE, so that the first UE derives a new key according to the NCC.

Step 1307: The second serving node receives an RRC connection reestablishment complete message sent by the first UE.

Step 1308: Send the RRC connection reestablishment complete message to the first anchor node, to enable the first anchor node and the first UE to reestablish an RRC connection.

As may be seen from the foregoing processing process, by means of the RRC reconnection method in this embodiment of the present invention, signaling load of a core network can be effectively reduced. Moreover, a second serving node may generate an RRC connection reestablishment message according to an auxiliary parameter delivered by a first anchor node, and instruct, by using the auxiliary parameter carried in the RRC connection reestablishment message, first UE to derive a new key according to the auxiliary parameter.

Figure 14:
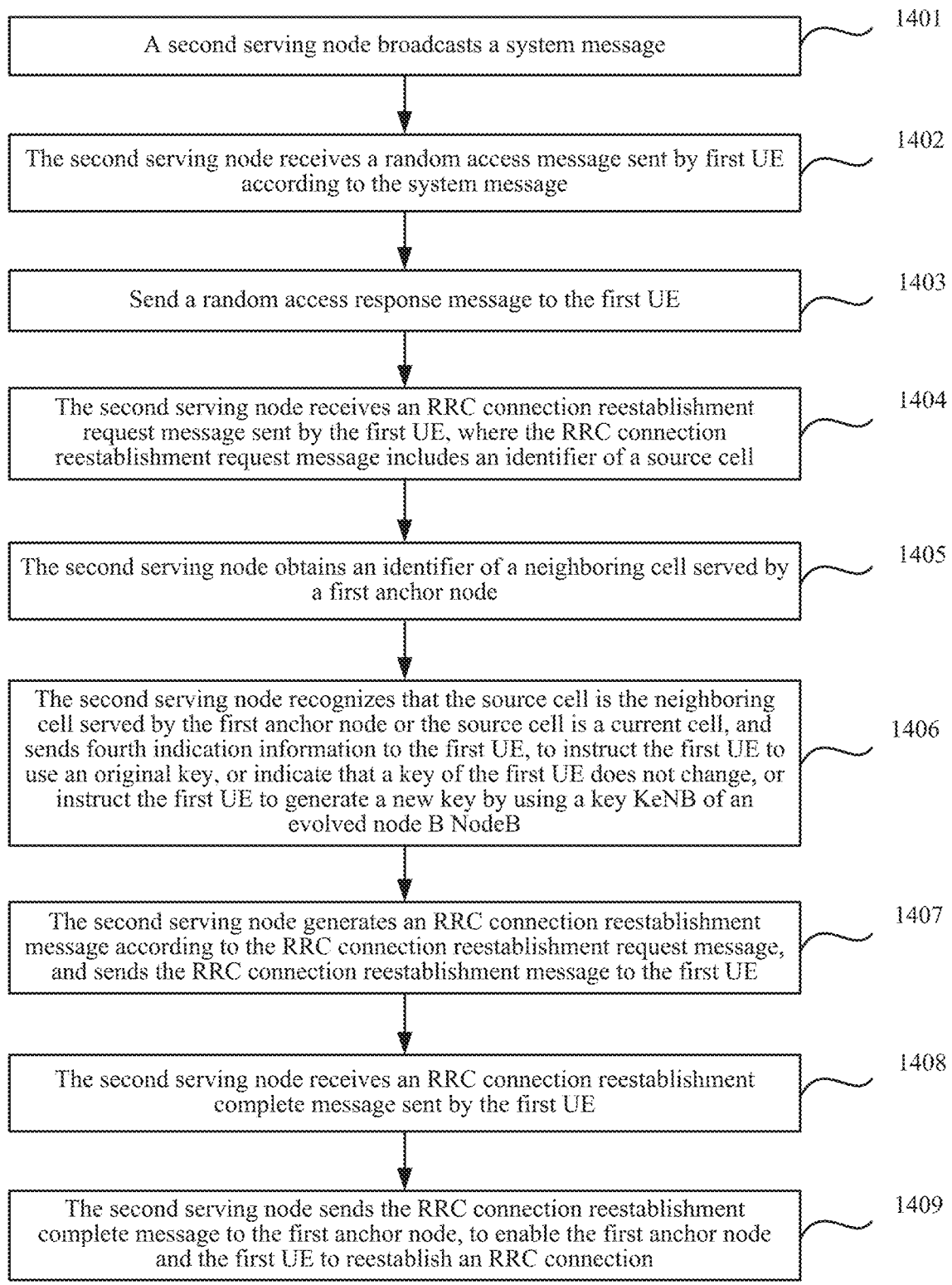
FIG. 14 is a flowchart of an RRC reconnection method on a side of a serving node according to Embodiment 13 of the present invention.

FIG. 14 is a flowchart of an RRC reconnection method on a side of a serving node according to Embodiment 13 of the present invention. The RRC connection method is based on the network architecture shown in FIG. 1. The method is performed by the serving node. A second serving node recognizes, according to an auxiliary parameter delivered by a first anchor node, whether a source cell of first UE is a neighboring cell of a cell at which the second serving node is located or a cell at which the second serving node is located. When it is recognized that the source cell of the first UE is the neighboring cell of the cell at which the second serving node is located or the cell at which the second serving node is located, the first UE is instructed to use an original key, and a new key does not need to be generated. As shown in FIG. 14, the method specifically includes the following steps.

Step 1401: The second serving node broadcasts a system message.

The system message is specifically a system message of an RRC layer.

Step 1402: The second serving node receives a random access message sent by the first UE according to the system message.

Step 1403: Send a random access response message to the first UE.

Step 1404: The second serving node receives an RRC connection reestablishment request message sent by the first UE, where the RRC connection reestablishment request message includes an identifier of the source cell.

The RRC connection reestablishment request message may be specifically an RRC connection reestablishment request message sent to the second serving node after an RLF occurs in the first UE.

Step 1405: The second serving node obtains an identifier of a neighboring cell served by the first anchor node.

The neighboring cell is a neighboring cell of the cell corresponding to the serving node.

Step 1406: The second serving node recognizes that the source cell is the neighboring cell served by the first anchor node or the source cell is a current cell, and sends fourth indication information to the first UE, to instruct the first UE to use an original key, or indicate that a key of the first UE does not change, or instruct the first UE to generate a new key by using a key KeNB of an evolved node B NodeB.

The original key is a security key originally used by the first UE. The fourth indication information may be specifically a new indication, or an NCC is set to NULL to represent this indication.

Step 1407: The second serving node generates an RRC connection reestablishment message according to the RRC connection reestablishment request message, and sends the RRC connection reestablishment message to the first UE.

Step 1406 and step 1407 may be combined to form one step, in which the fourth indication information is carried in the RRC connection reestablishment message and the RRC connection reestablishment message is sent to the first UE.

Step 1408: The second serving node receives an RRC connection reestablishment complete message sent by the first UE.

Step 1409: The second serving node sends the RRC connection reestablishment complete message to the first anchor node, to enable the first anchor node and the first UE to reestablish an RRC connection.

As may be seen from the foregoing processing process, by means of the RRC reconnection method provided in this embodiment of the present invention, signaling load of a core network can be effectively reduced. Moreover, a second serving node recognizes, according to an auxiliary parameter delivered by a first anchor node, whether a source cell of first UE is a neighboring cell served by the first anchor node or a cell at which the second serving node is located, that is, recognizes whether the second serving node and an original serving node of the first UE both belong to the first anchor node. When it is recognized that the source cell of the first UE is the neighboring cell served by the first anchor node or the cell at which the second serving node is located, that is, recognizes that the second serving node and the original serving node of the first UE both belong to the first anchor node, the first UE is instructed to use an original key, and a new key does not need to be generated, so that a processing time of the first UE can be effectively shortened.

Figure 15:
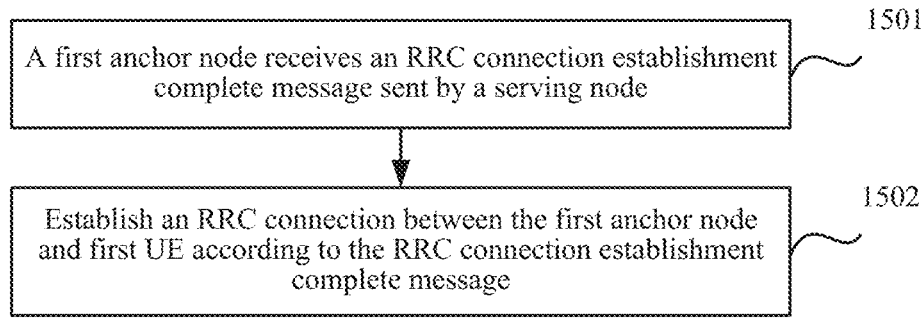
FIG. 15 is a flowchart of an RRC connection method on a side of an anchor node according to Embodiment 14 of the present invention.

FIG. 15 is a flowchart of an RRC connection method on a side of an anchor node according to Embodiment 14 of the present invention. The RRC connection method is based on the network architecture shown in FIG. 1. The method is performed by the anchor node. As shown in FIG. 15, the method specifically includes the following steps.

Step 1501: A first anchor node receives an RRC connection establishment complete message sent by a serving node.

Step 1502: Establish an RRC connection between the first anchor node and first UE according to the RRC connection establishment complete message.

The RRC connection establishment complete message is the RRC connection establishment complete message generated by the first UE according to an RRC connection establishment message sent by the serving node, and the RRC connection establishment complete message is sent to the serving node.

Specifically, after broadcasting a system message, receiving a random access message sent by the first UE according to the system message, and sending a random access response message to the first UE, the serving node receives an RRC connection request message sent by the first UE, and generates the RRC connection establishment message according to the RRC connection request message and sends the RRC connection establishment message to the first UE. After receiving an RRC connection establishment complete message sent by the first UE, the serving node sends the RRC connection establishment complete message to the first anchor node.

The method may further include: before the receiving, by the serving node, the RRC connection establishment complete message sent by the first UE, receiving, by the first anchor node, a configuration parameter and a UE identifier of the first UE that are sent by the serving node, so that the first anchor node knows the configuration parameter of the first UE.

The receiving, by the first anchor node, a configuration parameter that is of the first UE and that is sent by the serving node may include: receiving, by the first anchor node, the RRC connection establishment message sent by the serving node. The RRC connection establishment message includes the configuration parameter of the first UE, and the RRC connection establishment message carries first indication information, or a control plane signaling message that bears the RRC connection establishment message carries first indication information. The method may further include: recognizing, by the first anchor node according to the first indication information, that the RRC connection establishment message is an RRC message that an SRB0 bears. The RRC message is processed by using an RRC layer entity of the first anchor node.

In addition, the first indication information may also be separately sent by the serving node to the first anchor node. Correspondingly, the first anchor node further needs to receive the first indication information sent by the serving node.

The receiving, by a first anchor node, an RRC connection establishment complete message sent by a serving node may include: receiving, by the first anchor node, a control plane signaling message that is sent by the serving node and that bears the RRC connection establishment complete message. The RRC connection establishment complete message carries second indication information, or the control plane signaling message carries second indication information; and recognizing, by the first anchor node according to the second indication information, that the RRC connection establishment complete message is an RRC message that an SRB1 bears.

In addition, the second indication information may also be separately sent by the serving node to the first anchor node. Correspondingly, the first anchor node further needs to receive the second indication information sent by the serving node.

The method may further include: receiving, by the first anchor node, a corresponding PDCP PDU sent after an RLC layer entity of the serving node processes an RRC message that is sent by the first UE and that includes the RRC connection establishment complete message into the PDCP PDU, where the RRC message includes an RRC message that an SRB1 bears or an RRC message that an SRB2 bears, where the RRC connection establishment complete message is an RRC message that an SRB1 bears; and processing, by a first PDCP layer entity in the first anchor node, into the RRC message that an SRB1 bears, and sending the processed RRC message to an RRC layer entity; or processing, by a second PDCP layer entity in the first anchor node, into the RRC message that an SRB2 bears, and sending the processed RRC message to the RRC layer entity.

The method may further include: sending, by the first anchor node, a PDCP PDU corresponding to an RRC message to the serving node. The RRC message includes an RRC message that an SRB1 bears or an RRC message that an SRB2 bears, and the RRC message is used for a first RLC layer entity of the serving node to process the RRC message that an SRB1 bears and send the processed RRC message to the first UE by using a MAC layer and a physical layer, or the RRC message is used for a second RLC layer entity of the serving node to process the RRC message that an SRB2 bears and send the processed RRC message to the first UE by using a MAC layer and a physical layer.

As may be seen from the foregoing processing process, by means of this embodiment of the present invention, signaling load of a core network can be effectively reduced. Moreover, during establishment of an RRC connection between first UE and a first anchor node, a serving node processes an RRC connection request message and generates an RRC connection establishment message. Therefore, compared with generation of an RRC connection establishment message by an anchor node, a delay can be effectively reduced.

Figure 16:
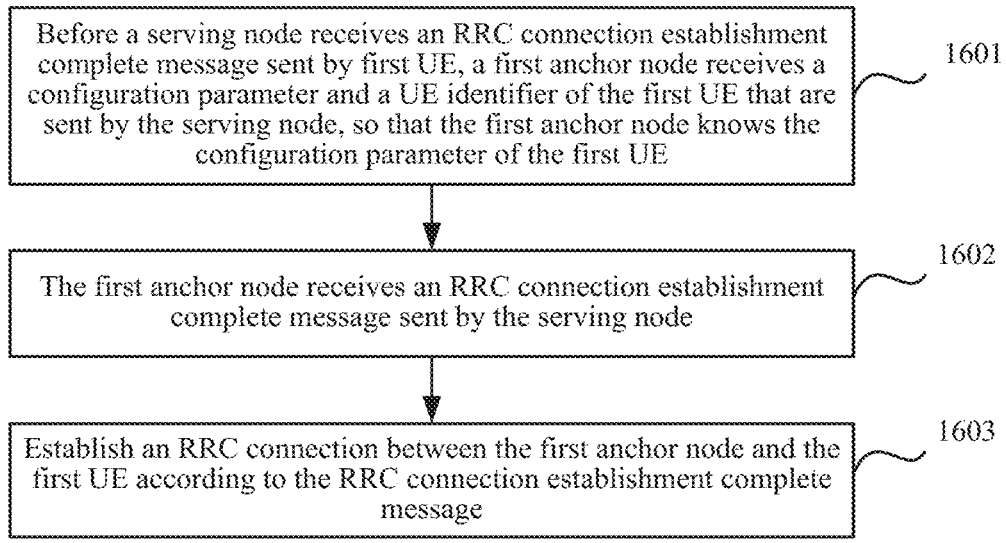
FIG. 16 is a flowchart of an RRC connection method on a side of an anchor node according to Embodiment 15 of the present invention.

FIG. 16 is a flowchart of an RRC connection method on a side of an anchor node according to Embodiment 15 of the present invention. The RRC connection method is based on the network architecture shown in FIG. 1. The method is performed by the anchor node. When an RRC message is sent between a serving node and the anchor node, indication information used to indicate an SRB type further needs to be sent. As shown in FIG. 16, the method specifically includes the following steps.

Step 1601: Before the serving node receives an RRC connection establishment complete message sent by first UE, a first anchor node receives a configuration parameter and a UE identifier of the first UE that are sent by the serving node, so that the first anchor node knows the configuration parameter of the first UE.

The receiving, by a first anchor node, a configuration parameter that is of the first UE and that is sent by the serving node may include: receiving, by the first anchor node, the RRC connection establishment message sent by the serving node. The RRC connection establishment message includes the configuration parameter of the first UE. The method may further include: receiving, by the first anchor node, first indication information sent by the serving node, and recognizing, by the first anchor node according to the first indication information, that the RRC connection establishment message is an RRC message that an SRB0 bears, and performing processing by using an RRC layer entity of the first anchor node.

In addition, the first indication information may further be carried in the RRC connection establishment message, or carried in a control plane signaling message that bears the RRC connection establishment message.

Step 1602: The first anchor node receives an RRC connection establishment complete message sent by the serving node.

Step 1603: Establish an RRC connection between the first anchor node and the first UE according to the RRC connection establishment complete message.

The RRC connection establishment complete message is the RRC connection establishment complete message generated by the first UE according to the RRC connection establishment message sent by the serving node, and the RRC connection establishment complete message is sent to the serving node.

Specifically, after broadcasting a system message, receiving a random access message sent by the first user equipment UE according to the system message, and sending a random access response message to the first UE, the serving node receives an RRC connection request message sent by the first UE, and generates the RRC connection establishment message according to the RRC connection request message and sends the RRC connection establishment message to the first UE. After receiving the RRC connection establishment complete message sent by the first UE, the serving node sends the RRC connection establishment complete message to the first anchor node.

The receiving, by the first anchor node, the RRC connection establishment complete message sent by the serving node may include: receiving, by the first anchor node, a control plane signaling message that is sent by the serving node and that bears the RRC connection establishment complete message, where the RRC connection establishment complete message carries second indication information, or the control plane signaling message carries second indication information; and recognizing, by the first anchor node according to the second indication information, that the RRC connection establishment complete message is an RRC message that an SRB1 bears.

The first anchor node may further separately receive second indication information sent by the serving node. The first anchor node recognizes, according to the second indication information, that the RRC connection establishment complete message is an RRC message that an SRB1 bears.

In this embodiment of the present invention, the method may further include: receiving, by the first anchor node, a corresponding PDCP PDU sent after an RLC layer entity of the serving node processes an RRC message that is sent by the first UE and that includes the RRC connection establishment complete message into the PDCP PDU, where the RRC message includes an RRC message that an SRB1 bears or an RRC message that an SRB2 bears, and the RRC connection establishment complete message is an RRC message that an SRB1 bears; and processing, by a first PDCP layer entity in the first anchor node, the RRC message that an SRB1 bears, and sending the processed RRC message to an RRC layer entity, or processing, by a second PDCP layer entity in the first anchor node, the RRC message that an SRB2 bears, and sending the processed RRC message to the RRC layer entity.

The method may further include: sending, by the first anchor node, a PDCP PDU corresponding to an RRC message to the serving node. The RRC message includes an RRC message that an SRB1 bears or an RRC message that an SRB2 bears, and the RRC message is used for a first RLC layer entity of the serving node to process the RRC message that an SRB1 bears and send the processed RRC message to the first UE by using a MAC layer and a physical layer, or the RRC message is used for a second RLC layer entity of the serving node to process the RRC message that an SRB2 bears and send the processed RRC message to the first UE by using a MAC layer and a physical layer.

As may be seen from the foregoing processing process, in this embodiment of the present invention, for an RRC message sent between a serving node and an anchor node, indication information used to indicate an SRB type further needs to be sent, so that the serving node and the anchor node perform corresponding processing according to the SRB type, thereby implementing separation of RRC functions on the serving node and the anchor node.

Figure 17:
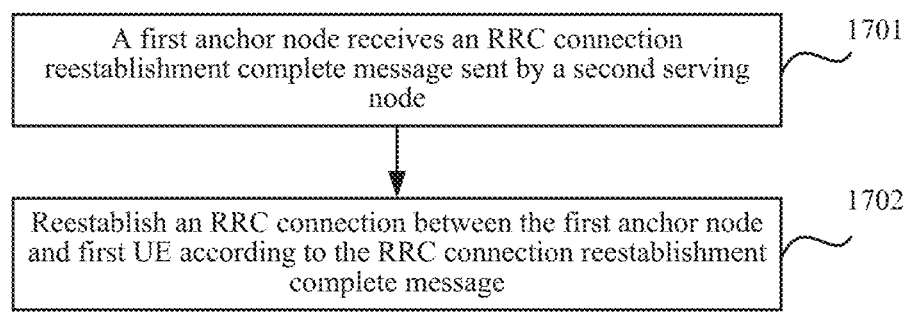
FIG. 17 is a flowchart of an RRC reconnection method on a side of an anchor node according to Embodiment 16 of the present invention.

FIG. 17 is a flowchart of an RRC reconnection method on a side of an anchor node according to Embodiment 16 of the present invention. The RRC reconnection method is based on the network architecture shown in FIG. 1. The method is performed by the anchor node. As shown in FIG. 17, the method specifically includes the following steps.

Step 1701: A first anchor node receives an RRC connection reestablishment complete message sent by a second serving node.

Step 1702: Reestablish an RRC connection between the first anchor node and first UE according to the RRC connection reestablishment complete message.

The RRC connection reestablishment complete message is the RRC connection reestablishment complete message generated by the first UE according to an RRC connection reestablishment message sent by the second serving node, and the RRC connection reestablishment complete message is sent to the second serving node.

Specifically, after broadcasting a system message, receiving a random access message sent by the first user equipment UE according to the system message, and sending a random access response message to the first UE, the second serving node receives an RRC connection reestablishment request message sent by the first UE, and generates the RRC connection reestablishment message according to the RRC connection reestablishment request message and sends the RRC connection reestablishment message to the first UE. After receiving the RRC connection reestablishment complete message sent by the first UE, the serving node sends the RRC connection reestablishment complete message to the first anchor node.

Before the receiving, by the second serving node, an RRC connection reestablishment complete message sent by the first UE, the method may further include: receiving, by the first anchor node, the RRC connection reestablishment message and first indication information sent by the second serving node, and recognizing, by the first anchor node according to the first indication information, that the RRC connection reestablishment message is an RRC message that an SRB0 bears. The RRC message is processed by using an RRC layer entity of the first anchor node.

Alternatively, before the receiving, by the second serving node, an RRC connection reestablishment complete message sent by the first UE, the method may further include: receiving, by the first anchor node, the RRC connection reestablishment message sent by the second serving node. The RRC connection reestablishment message carries first indication information, or a control plane signaling message that bears the RRC connection reestablishment message carries first indication information. The first indication information is used for the first anchor node to recognize, according to the first indication information, that the RRC connection reestablishment message is an RRC message that an SRB0 bears. The RRC message is processed by using an RRC layer entity of the first anchor node.

Before the receiving, by the second serving node, an RRC connection reestablishment complete message sent by the first UE, the method may further include: receiving, by the first anchor node, a configuration parameter that is of the first UE and that is sent by the second serving node, so that the first anchor node knows the configuration parameter of the first UE.

The receiving, by a first anchor node, an RRC connection reestablishment complete message sent by a second serving node may include: receiving, by the first anchor node, the RRC connection reestablishment complete message sent by the second serving node, where the RRC connection reestablishment complete message carries second indication information, or a control plane signaling message that bears the RRC connection reestablishment complete message carries second indication information; and recognizing, by the first anchor node according to the second indication information, that the RRC connection reestablishment complete message is an RRC message that an SRB1 bears.

Alternatively, the method may further include: receiving, by the first anchor node, second indication information sent by the second serving node, and recognizing, by the first anchor node according to the second indication information, that the RRC connection reestablishment complete message is an RRC message that an SRB1 bears.

The method may further include:
receiving, by the first anchor node, a corresponding PDCP PDU sent to the first anchor node after an RLC layer entity of the second serving node processes an RRC message that is sent by the first UE and that includes the RRC connection reestablishment complete message into the PDCP PDU, where the RRC message includes an RRC message that an SRB1 bears or an RRC message that an SRB2 bears, and the RRC connection reestablishment complete message is an RRC message that an SRB1 bears; and processing, by a first PDCP layer entity in the first anchor node, the RRC message that an SRB1 bears, and sending the processed RRC message to an RRC layer entity, or processing, by a second PDCP layer entity in the first anchor node, the RRC message that an SRB2 bears, and sending the processed RRC message to the RRC layer entity.

The method may further include:
sending, by the first anchor node, a PDCP PDU corresponding to an RRC message to the second serving node, where the RRC message includes an RRC message that an SRB1 bears or an RRC message that an SRB2 bears, and the RRC message is used for a first RLC layer entity of the second serving node to process the RRC message that an SRB1 bears and send the processed RRC message to the first UE by using a MAC layer and a physical layer, or the RRC message is used for a second RLC layer entity of the second serving node to process the RRC message that an SRB2 bears and send the processed RRC message to the first UE by using a MAC layer and a physical layer.

As may be seen from the foregoing processing process, the RRC reconnection method provided in this embodiment of the present invention, signaling load of a core network can be effectively reduced.

Figure 18:
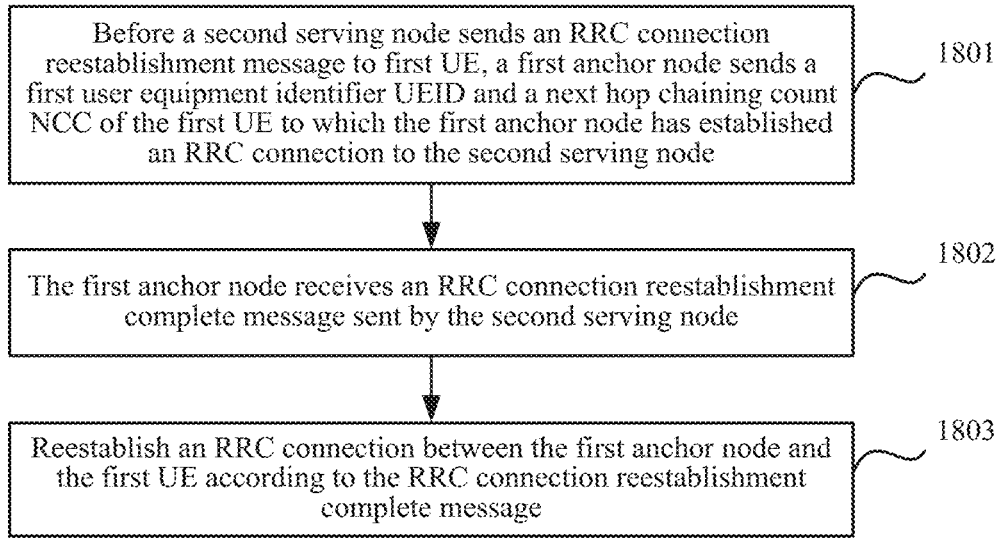
FIG. 18 is a flowchart of an RRC reconnection method on a side of an anchor node according to Embodiment 17 of the present invention.

FIG. 18 is a flowchart of an RRC reconnection method on a side of an anchor node according to Embodiment 17 of the present invention. The RRC reconnection method is based on the network architecture shown in FIG. 1. The method is performed by the anchor node, so that a second serving node instructs, according to an auxiliary parameter delivered by the anchor node, UE to generate a key according to the auxiliary parameter. As shown in FIG. 18, the method specifically includes:

Step 1801: Before the second serving node sends an RRC connection reestablishment message to first UE, a first anchor node sends a first user equipment identifier UEID and a next hop chaining count NCC of the first UE to which the first anchor node has established an RRC connection to the second serving node.

In this embodiment of the present invention, the sending, by a first anchor node, a first user equipment identifier UEID and a next hop chaining count NCC of the first UE to which the first anchor node has established an RRC connection to the second serving node may include:

after the first anchor node has established an RRC connection to the first UE, sending, by the first anchor node, the first user equipment identifier UEID and the next hop chaining count NCC of the first UE to which the first anchor node has established an RRC connection to the second serving node; or after the first anchor node receives a request message sent by the second serving node, sending the first UEID and the NCC of the first UE to which the first anchor node has established an RRC connection to the second serving node.

In addition, after the sending, by the first anchor node, a first user equipment identifier UEID and a next hop chaining count NCC of the first UE to which the first anchor node has established an RRC connection to the second serving node, the method may further include: after the RRC connection of the first UE is disconnected from the first anchor node, sending, by the first anchor node, signaling to the second serving node, so that the second serving node releases the NCC of the first UE according to the signaling.

Step 1802: The first anchor node receives an RRC connection reestablishment complete message sent by the second serving node.

Step 1803: Reestablish an RRC connection between the first anchor node and the first UE, according to the RRC connection reestablishment complete message.

The RRC connection reestablishment complete message is the RRC connection reestablishment complete message generated by the first UE according to the RRC connection reestablishment message sent by the second serving node, and the RRC connection reestablishment complete message is sent to the second serving node.

Specifically, after broadcasting a system message, receiving a random access message sent by the first user equipment UE according to the system message, and sending a random access response message to the first UE, the second serving node receives an RRC connection reestablishment request message sent by the first UE, and generates the RRC connection reestablishment message according to the RRC connection reestablishment request message and sends the RRC connection reestablishment message to the first UE. After receiving the RRC connection reestablishment complete message sent by the first UE, the serving node sends the RRC connection reestablishment complete message to the first anchor node.

The receiving, by the second serving node, an RRC connection reestablishment request message sent by the first UE may include: receiving, by the second serving node, the RRC connection reestablishment request message sent by the first UE. The RRC connection reestablishment request message includes the first UEID.

The generating, by the second serving node, the RRC connection reestablishment message according to the RRC connection reestablishment request message, and sending the RRC connection reestablishment message to the first UE may include: obtaining, by the second serving node, the NCC according to the first UEID, generating the RRC connection reestablishment message including the NCC, and sending the RRC connection reestablishment message to the first UE, so that the first UE derives a new key according to the NCC.

As may be seen from the foregoing processing process, in the RRC reconnection method in this embodiment of the present invention, signaling load of a core network can be effectively reduced. Moreover, and a second serving node may generate an RRC connection reestablishment message according to an auxiliary parameter delivered by a first anchor node, and instruct, by using the auxiliary parameter carried in the RRC connection reestablishment message, first UE to derive a new key according to the auxiliary parameter.

Figure 19:
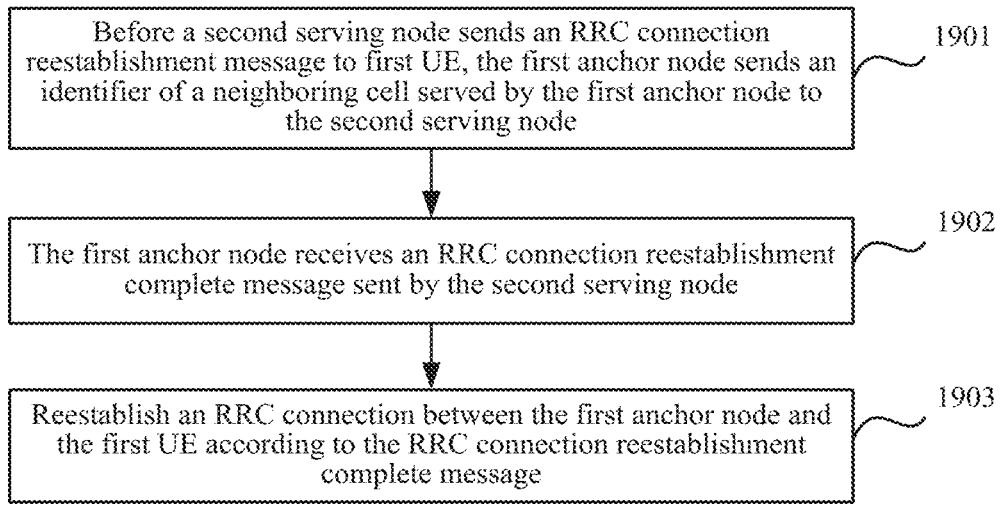
FIG. 19 is a flowchart of an RRC reconnection method on a side of an anchor node according to Embodiment 18 of the present invention.

FIG. 19 is a flowchart of an RRC reconnection method on a side of an anchor node according to Embodiment 18 of the present invention. The RRC connection method is based on the network architecture shown in FIG. 1. The method is performed by anchor node, so that a second serving node recognizes, according to an auxiliary parameter delivered by a first anchor node, whether a source cell of first UE is a neighboring cell of a cell at which the second serving node is located or a cell at which the second serving node is located. When it is recognized that the source cell of the first UE is the neighboring cell of the cell at which the second serving node is located or the cell at which the second serving node is located, the first UE is instructed to use an original key, and a new key does not need to be generated. As shown in FIG. 19, the method specifically includes the following steps.

Step 1901: Before the second serving node sends the RRC connection reestablishment message to the first UE, the first anchor node sends an identifier of a neighboring cell served by the first anchor node to the second serving node.

Step 1902: The first anchor node receives an RRC connection reestablishment complete message sent by the second serving node.

Step 1903: Reestablish an RRC connection between the first anchor node and the first UE according to the RRC connection reestablishment complete message.

The RRC connection reestablishment complete message is the RRC connection reestablishment complete message generated by the first UE according to the RRC connection reestablishment message sent by the second serving node, and the RRC connection reestablishment complete message is sent to the second serving node.

Specifically, after broadcasting a system message, receiving a random access message sent by the first user equipment UE according to the system message, and sending a random access response message to the first UE, the second serving node receives an RRC connection reestablishment request message sent by the first UE, and generates the RRC connection reestablishment message according to the RRC connection reestablishment request message and sends the RRC connection reestablishment message to the first UE. After receiving the RRC connection reestablishment complete message sent by the first UE, the serving node sends the RRC connection reestablishment complete message to the first anchor node.

The RRC connection reestablishment request message includes an identifier of a source cell, so that the second serving node recognizes that the source cell is the neighboring cell served by the first anchor node or the source cell is a current cell, and sends fourth indication information to the first UE, to instruct the first UE to use the original key, or indicate that a key of the first UE does not change, or instruct the first UE to generate a new key by using a KeNB.

As may be seen from the foregoing processing process, in the RRC reconnection method provided in this embodiment of the present invention, signaling load of a core network can be effectively reduced. Moreover, a second serving node recognizes, according to an auxiliary parameter delivered by a first anchor node, whether a source cell of first UE is a neighboring cell served by the first anchor node or a cell at which the second serving node is located, that is, recognizes whether the second serving node and an original serving node of the first UE belong to the first anchor node. When it is recognized that the source cell of the first UE is the neighboring cell served by the first anchor node or the cell at which the second serving node is located, that is, it is recognized that the second serving node and the original serving node of the first UE both belong to the first anchor node, the first UE is instructed to use an original key, and a new key does not need to be generated, so that a processing time of the first UE can be effectively shortened.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

The invention claimed is:

1. A radio resource control (RRC) connection method applied for an anchor node, comprising:
    receiving a configuration parameter and an identifier of a user equipment (UE) from a serving node, wherein the anchor node and the serving node are base station nodes, and wherein the configuration parameter includes a media access control (MAC) layer configuration parameter, a physical layer configuration parameter, an srb-Identity parameter, an rlc-Config parameter, or a logicalChannelConfig parameter;
    receiving a control plane signaling message from the serving node, wherein the control plane signaling message carries a first message and an indication information, wherein the indication information is included in the control plane signaling message after the first message is received by the serving node from the UE and prior to sending the control plane signaling message, and wherein the indication information indicates that the first message is an RRC message that a signaling radio bearer 1 (SRB1) bears; and
    establishing an RRC connection between the anchor node and the UE.

2. The method according to claim 1, wherein the first message is generated by the UE, according to an RRC connection establishment message sent by the serving node, and the first message is sent by the UE to the serving node.

3. The method according to claim 2, wherein that before the first message is sent to the serving node by the UE, performing the receiving, by the anchor node, the configuration parameter and the identifier of the UE from the serving node.

4. The method according to claim 1, wherein the method further comprises:
    receiving a corresponding packet data convergence protocol protocol data unit (PDCP PDU), wherein the PDCP PDU is received from a radio link control (RLC) layer entity of the serving node after the RLC entity of the serving node processed a first RRC message from the UE, wherein the first RRC message comprises the first message, and the first message is carried by the SRB1; and
    processing, by a first PDCP layer entity in the anchor node, the first message that is carried by the SRB1, and sending the processed first message to an RRC layer entity; or
    processing, by a second PDCP layer entity in the anchor node, the first RRC message that carried by an SRB2, and sending the processed first RRC message to the RRC layer entity.

5. The method according to claim 1, wherein the first message is a RRC connection establishment complete message.

6. An apparatus, applied for an anchor node, comprising:
    at least one processor, and a memory storing instructions for execution by the at least one processor to perform operations comprising:
        receiving a configuration parameter and an identifier of a user equipment (UE) from a serving node, wherein the anchor node and the serving node are base station nodes, and wherein the configuration parameter includes includes a media access control (MAC) layer configuration parameter, a physical layer configuration parameter, an srb-Identity parameter, an rlc-Config parameter, or a logicalChannelConfig parameter;
        receiving a control plane signaling message from the serving node, wherein the control plane signaling message carries a first message and an indication information, wherein the indication information is included in the control plane signaling message after the first message is received by the serving node from the UE and prior to sending the control plane signaling message, and wherein the indication information indicates that the first message is an RRC message that a signaling radio bearer 1 (SRB1) bears; and
        establishing an RRC connection between the anchor node and the UE.

7. The apparatus according to claim 6, wherein the first message is generated by the UE, according to an RRC connection establishment message sent by the serving node, and the first message is sent by the UE to the serving node.

8. The apparatus according to claim 7, wherein that before the first message is sent to the serving node by the UE, performing the receiving the configuration parameter and the identifier of the UE from the serving node.

9. The apparatus according to claim 6, wherein the operations comprising:
    receiving a corresponding packet data convergence protocol protocol data unit (PDCP PDU), wherein the PDCP PDU is received from a radio link control (RLC) layer entity of a serving node after the RLC entity of the serving node processed a first RRC message from the UE, wherein the first RRC message comprises the first message, and the first message is carried by the SRB1; and
    processing, by a first PDCP layer entity in the anchor node, the first message that is carried by the SRB1, and sending the processed first message to an RRC layer entity; or
    processing, by a second PDCP layer entity in the anchor node, the first RRC message that carried by an SRB2, and sending the processed first RRC message to the RRC layer entity.

10. The apparatus according to claim 6, wherein the first message is a RRC connection establishment complete message.

11. An apparatus, applied for a serving node, comprising:
    at least one processor, and a memory storing instructions for execution by the at least one processor to perform operations comprising:
        sending a configuration parameter and an identifier of a user equipment (UE) to an anchor node, wherein the anchor node and the apparatus are base station nodes, and wherein the configuration parameter includes a media access control (MAC) layer configuration parameter, a physical layer configuration parameter, an srb-Identity parameter, an rlc-Config parameter, or a logicalChannelConfig parameter; and
        sending a control plane signaling message to the anchor node, wherein the control plane signaling message carries a first message and an indication information, wherein the indication information is included in the control plane signaling message after the first message is received by the serving node from the UE and prior to sending the control plane signaling message, and wherein the indication information indicates that the first message is an RRC message that a signaling radio bearer 1 (SRB1) bears.

12. The apparatus according to claim 11, wherein the first message is generated by the UE according to an RRC connection establishment message.

13. The apparatus according to claim 12, wherein the operations comprising:
receiving the first message from the UE; and
before the serving node receiving the first message from the UE, sending the configuration parameter and the identifier of the UE to the anchor node.

14. The apparatus according to claim 11, wherein the operations comprising:
after sending the configuration parameter and the identifier of the UE, receive the control plane signaling message from the UE.

15. The apparatus according to claim 11, wherein the first message is a RRC connection establishment complete message.

16. A method, comprising:
sending, by a serving node to an anchor node, a configuration parameter and an identifier of a user equipment (UE), wherein the anchor node and the serving node are base station nodes, and wherein the configuration parameter includes a media access control (MAC) layer configuration parameter, a physical layer configuration parameter, an srb-Identity parameter, an rlc-Config parameter, or a logicalChannelConfig parameter; and
sending, by the serving node to the anchor node, a control plane signaling message, wherein the control plane signaling message carries a first message and an indication information, wherein the indication information is included in the control plane signaling message after the first message is received by the serving node from the UE and prior to sending the control plane signaling message, and wherein the indication information indicates that the first message is an RRC message that a signaling radio bearer 1 (SRB1) bears.

17. The method according to claim 16, wherein the first message is generated by the UE, according to an RRC connection establishment message sent by the serving node, and the first message is sent by the UE to the serving node.

18. The method according to claim 17, wherein that before the first message is sent to the serving node by the UE, performing the receiving, by the anchor node, the configuration parameter and the identifier of the UE from the serving node.

19. The method according to claim 16, wherein the method further comprises:
sending, by the serving node, a corresponding packet data convergence protocol protocol data unit (PDCP PDU);
receiving, by the anchor node, the corresponding packet data convergence protocol protocol data unit (PDCP PDU), wherein the PDCP PDU is received from a radio link control (RLC) layer entity of the serving node after the RLC entity of the serving node processed a first RRC message from the UE, wherein the first RRC message comprises the first message, and the first message is carried by the SRB1; and
processing, by a first PDCP layer entity in the anchor node, the first message that is carried by the SRB1, and sending the processed first message to an RRC layer entity; or
processing, by a second PDCP layer entity in the anchor node, the first RRC message that carried by an SRB2, and sending the processed first RRC message to the RRC layer entity.

20. The method according to claim 16, wherein first message is a RRC connection establishment complete message.

* * * * *